US010864570B2

(12) United States Patent
Angerer et al.

(10) Patent No.: US 10,864,570 B2
(45) Date of Patent: Dec. 15, 2020

(54) BENDING ANGLE MEASURING APPARATUS AND METHOD FOR MEASURING A BENDING ANGLE BY MEANS OF THE BENDING ANGLE MEASURING APPARATUS

(71) Applicant: TRUMPF Maschinen Austria GmbH & Co. KG., Pasching (AT)

(72) Inventors: Gerhard Angerer, Altenberg (AT); Klemens Freudenthaler, Linz (AT); Florian Hausmann, Traun (AT); Matthias Hoerl, Oberndorf/Tirol (AT); Nenad Kovjenic, Linz (AT); Florian Maier, Leonding (AT); Helmut Theis, Pfarrkirchen (AT); Manfred Waldherr, Linz (AT)

(73) Assignee: TRUMPF MASCHINEN AUSTRIA GMBH & CO. KG, Pasching (AT)

( * ) Notice: Subject to any disclaimer, the term of this patent is extended or adjusted under 35 U.S.C. 154(b) by 542 days.

(21) Appl. No.: 15/327,667

(22) PCT Filed: Jul. 22, 2015

(86) PCT No.: PCT/AT2015/050176
§ 371 (c)(1),
(2) Date: Mar. 10, 2017

(87) PCT Pub. No.: WO2016/011472
PCT Pub. Date: Jan. 28, 2016

(65) Prior Publication Data
US 2017/0203349 A1    Jul. 20, 2017

(30) Foreign Application Priority Data
Jul. 23, 2014 (AT) .............................. A 50515/2014

(51) Int. Cl.
*B21D 5/00* (2006.01)
*G01B 11/26* (2006.01)
*B21D 5/02* (2006.01)

(52) U.S. Cl.
CPC ............... *B21D 5/006* (2013.01); *B21D 5/02* (2013.01); *G01B 11/26* (2013.01)

(58) Field of Classification Search
CPC .......... B21D 5/006; B21D 5/02; B21D 5/002; B21D 5/0209
(Continued)

(56) References Cited

U.S. PATENT DOCUMENTS 3,837,198 A * 9/1974 Higgins ............. G01B 11/2509
29/407.04
4,758,729 A * 7/1988 Monnin ................. G01B 11/26
250/559.22
(Continued)

FOREIGN PATENT DOCUMENTS

CN    103499330 A  *  1/2014
CN    107490343 B  *  8/2019
(Continued)

OTHER PUBLICATIONS

International Search Report of PCT/AT2015/050176, dated Nov. 3, 2015.

*Primary Examiner* — Teresa M Ekiert
*Assistant Examiner* — Jared O Brown
(74) *Attorney, Agent, or Firm* — Collard & Roe, P.C.

(57) ABSTRACT

A bending angle measuring device has an illumination device with at least one light source and an optical detector with a light-detecting surface. On the bending angle measuring device is arranged at least one axisymmetric body with a reflecting surface. A central axis of the axisymmetric body is arranged such that it is aligned parallel to the (Continued)

bending edge. A first light beam transmitted by the illumination device is reflected from the sheet metal part and as a second light beam is directed onto the axisymmetric body. The second light beam is reflected on the axisymmetric body, and as a third light beam is directed onto the optical detector, in particular onto its light-detecting surface.

27 Claims, 15 Drawing Sheets

(58) Field of Classification Search
USPC .................................................. 72/31.1, 37
See application file for complete search history.

(56) References Cited

U.S. PATENT DOCUMENTS

| | | | | |
|---|---|---|---|---|
| 5,311,286 A | * | 5/1994 | Pike | G01B 11/303 250/237 G |
| 5,329,597 A | * | 7/1994 | Kouno | G01B 11/024 348/142 |
| 6,011,254 A | * | 1/2000 | Sano | G01C 9/06 200/61.45 R |
| 6,268,912 B1 | | 7/2001 | Brinkman et al. | |
| 6,415,639 B1 | * | 7/2002 | Kilian | B21D 5/00 72/342.1 |
| 6,480,269 B2 | | 11/2002 | Brinkman et al. | |
| 6,727,986 B1 | | 4/2004 | Serruys | |
| 7,802,456 B2 | * | 9/2010 | Ikeda | B21D 5/02 72/16.2 |
| 8,393,193 B2 | * | 3/2013 | Sperrer | B21D 5/02 72/389.3 |
| 8,643,831 B1 | * | 2/2014 | Gregory | G01S 17/46 356/139.07 |
| 8,692,877 B2 | * | 4/2014 | Appleyard | B21D 55/00 348/126 |
| 2003/0164952 A1 | | 9/2003 | Deichmann et al. | |
| 2005/0035295 A1 | * | 2/2005 | Bouma | A61B 5/0059 250/341.1 |
| 2008/0137099 A1 | * | 6/2008 | Hugers | G01M 11/0264 356/601 |
| 2010/0060718 A1 | | 3/2010 | Forster et al. | |
| 2010/0174507 A1 | * | 7/2010 | Vogel | G01B 11/26 702/151 |
| 2013/0291610 A1 | | 11/2013 | Nardetto et al. | |
| 2015/0253240 A1 | * | 9/2015 | Rowe | G01B 9/02044 356/451 |
| 2017/0138724 A1 | * | 5/2017 | Woegerbauer | B21D 5/0209 |

FOREIGN PATENT DOCUMENTS

| | | |
|---|---|---|
| DE | 199 39 837 A1 | 3/2001 |
| DE | 10 2006 054 310 A1 | 5/2008 |
| EP | 1 102 032 A1 | 5/2001 |
| EP | 0 915 320 B1 | 3/2004 |
| JP | S59-160708 A | 9/1984 |
| JP | H01-199104 A | 8/1989 |
| JP | 2002-059217 A | 2/2002 |
| JP | 2002059217 A * | 2/2002 |
| WO | 2010/053428 A1 | 5/2010 |
| WO | 2013/059851 A1 | 5/2013 |

\* cited by examiner

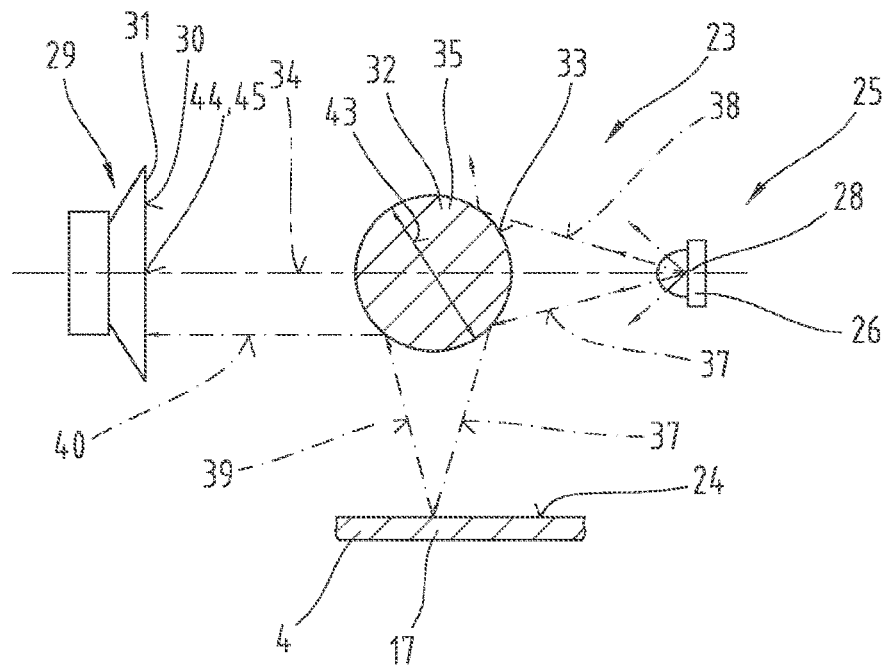
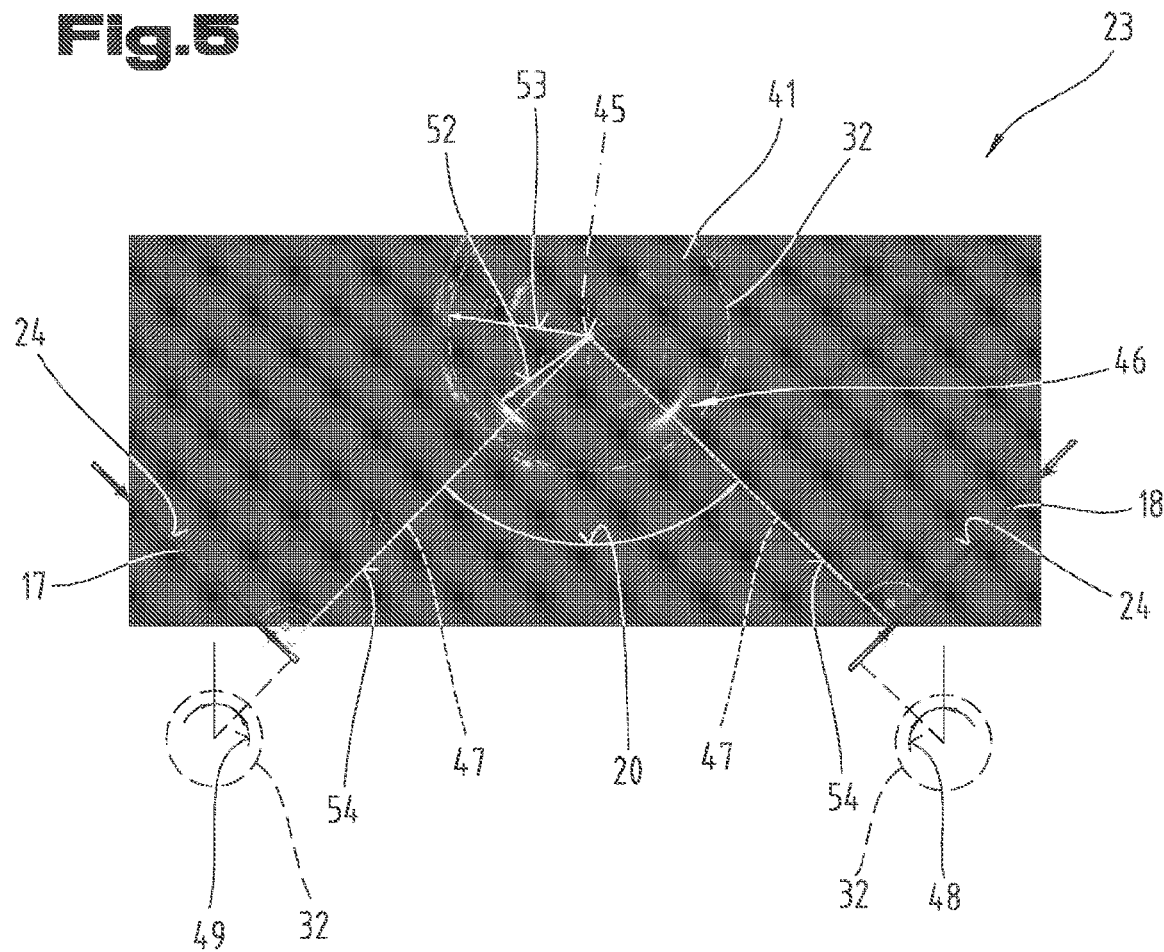

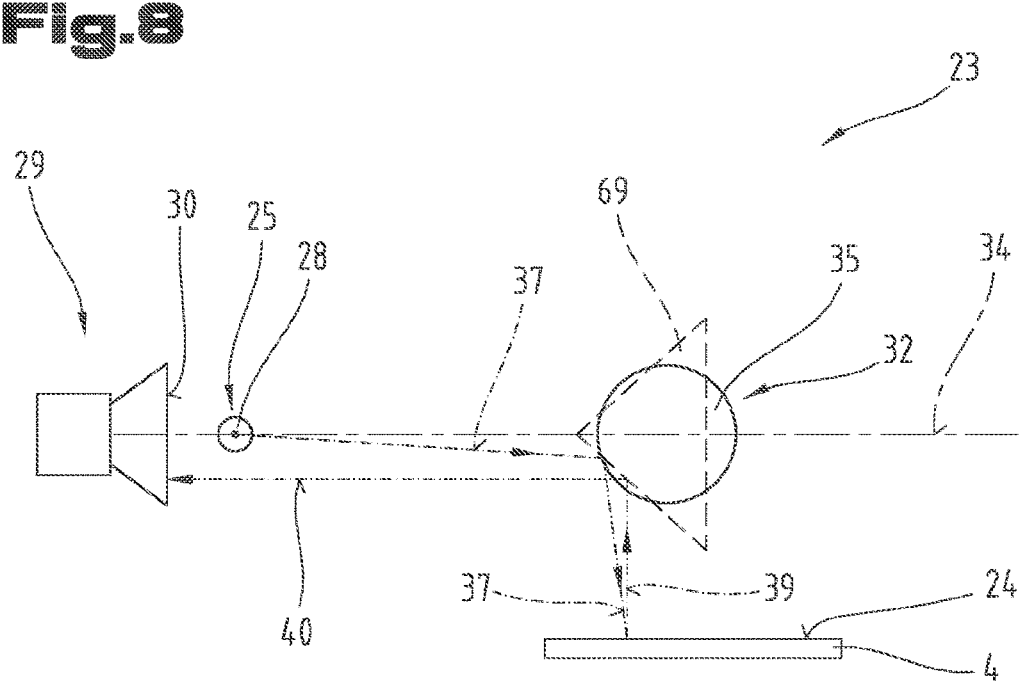
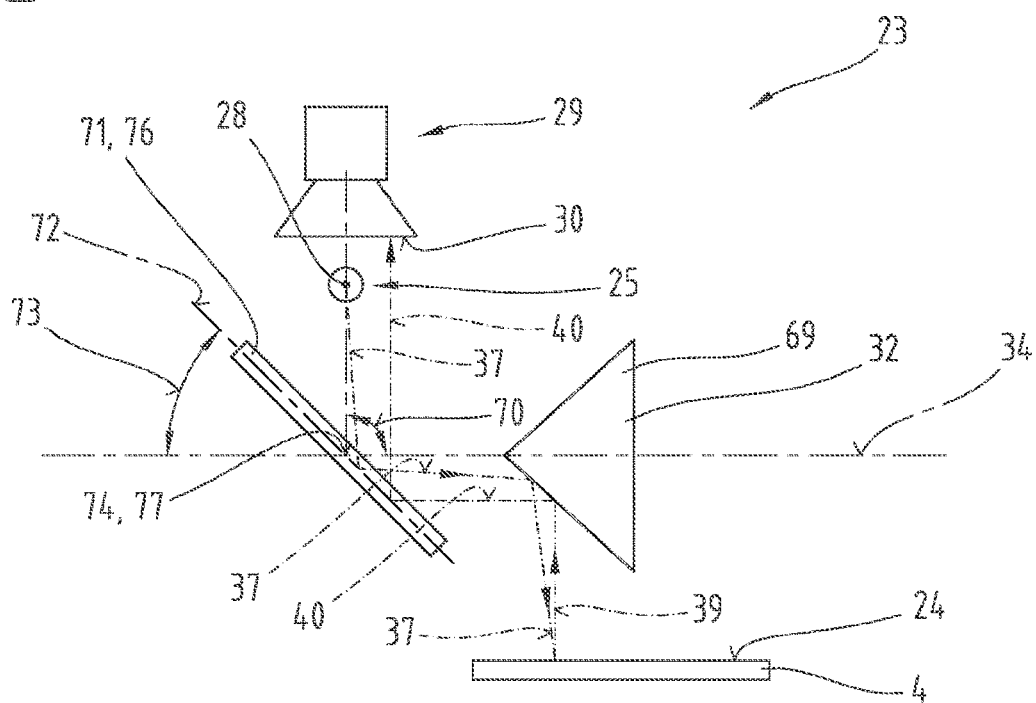

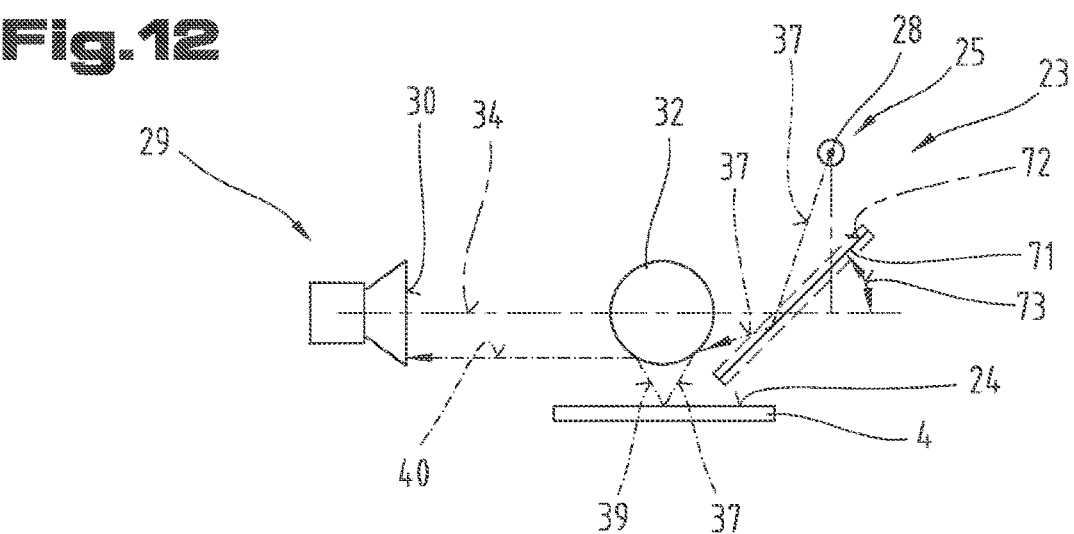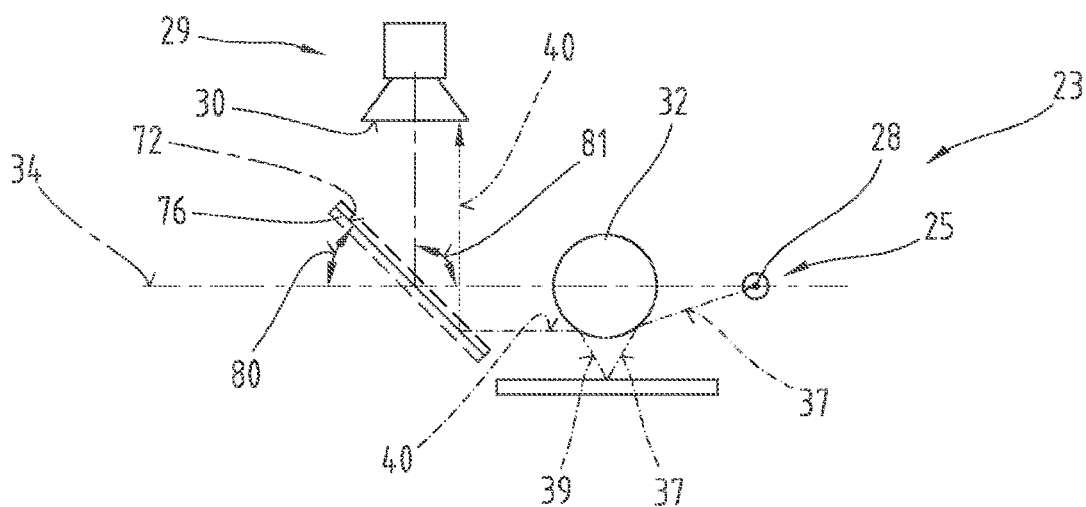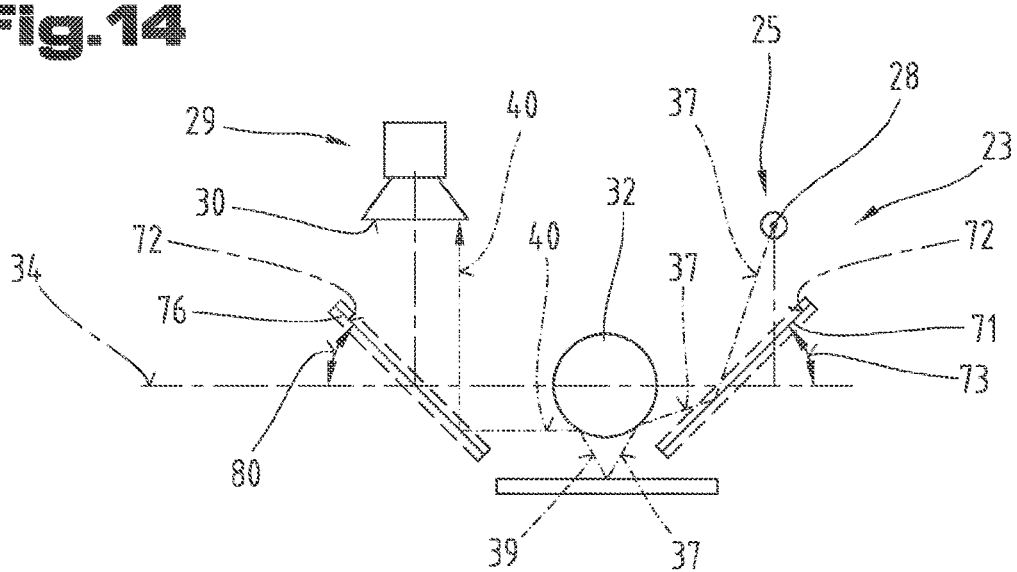

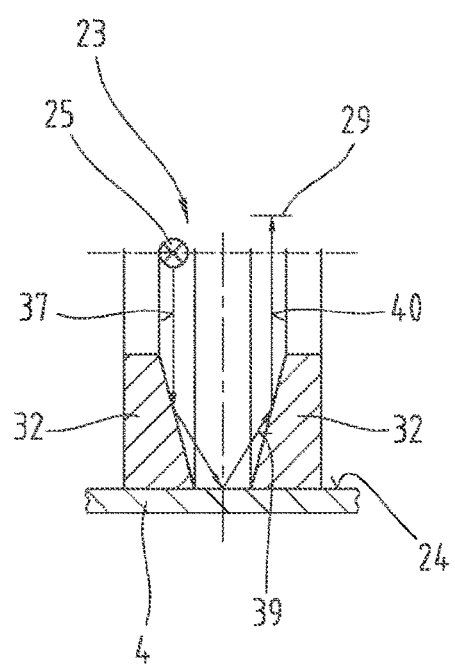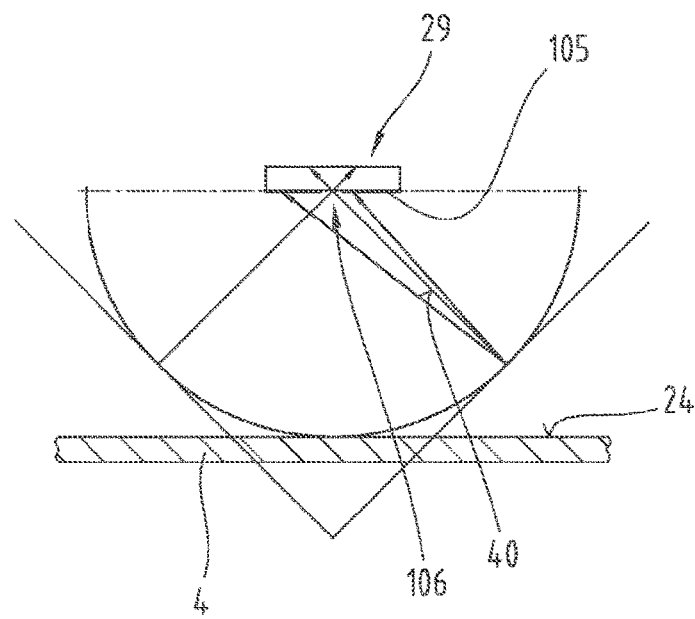

BENDING ANGLE MEASURING APPARATUS AND METHOD FOR MEASURING A BENDING ANGLE BY MEANS OF THE BENDING ANGLE MEASURING APPARATUS

CROSS REFERENCE TO RELATED APPLICATIONS

This application is the National Stage of PCT/AT2015/050176 filed on Jul. 22, 2015, which claims priority under 35 U.S.C. § 119 of Austrian Application No. A 50515/2014 filed on Jul. 23, 2014, the disclosures of which are incorporated by reference. The international application under PCT article 21(2) was not published in English.

The invention concerns a bending angle measuring device, a bending machine equipped with the bending angle measuring device, and also a method for measuring a bending angle by means of the bending angle measure device.

From EP 0 915 320 B1 a method and a device for the optical determination of a bending angle in a sheet workpiece during the bending process with a bending press are of known art. For purposes of determining the bending angle, from a light source, which is arranged on a pivotable angle measuring device, a directional light beam is radiated onto the measured object, reflected from the measured object, and captured by two optical sensors, which are also arranged on the pivotable angle measuring device. During the measuring process the angle measuring device is pivoted into an axis parallel to the bending line, whereby the light intensity impinging on the optical sensor achieves its maximum, if the directional light beam emitted from the light source is reflected from the surface of the measured object and impinges exactly on one of the two sensors. During this process of pivoting the angle measuring device, the current angular position of the angle measuring device is continuously checked. The two sensors are in each case arranged on the angle measuring device at equal distances from the light source, so that in each case the maximum light intensity is achieved with the same angle relative to the perpendicular from the light source onto the surface of the measured object. In that the sensors are arranged on the angle measuring device at equal distances from the light source, it is possible to determine the centre, and thereby the perpendiculars onto the surface of the measured object.

EP 0 915 320 B1 has the disadvantage that for purposes of determining a bending angle the angle measuring device must be pivoted constantly, so that the latter has a complex mechanical structure, which is maintenance intensive and susceptible to defects. Moreover, the bending angle cannot be detected in a timely manner during the bending process.

The object underlying the present invention is to create a bending angle measuring device, which is constructed as simply as possible, and without contact allows a precise and rapid determination of the bending angle.

This object of the invention is achieved by means of the measures described herein.

In accordance with the invention a bending angle measuring device is designed or a bending machine, in particular a bending press, whereby a sheet metal part that is to be bent is arranged in the bending machine, which sheet metal part has a first and a second flank and a bending edge located between the two flanks, whereby the bending angle measuring device has an illumination device, with at least one light source and an optical means of detection with a light-detecting surface. On the bending angle measuring device is arranged at least one axisymmetric body with a reflecting surface, whereby a central axis of the axisymmetric body is arranged such that it is aligned parallel to the bending edge, whereby a first light beam transmitted by the illumination device is reflected from the sheet metal part, and as a second light beam is directed onto the axisymmetric body, and as a third light beam is directed onto the optical means of detection, in particular onto its light-detecting surface.

An advantage of the inventive bending angle measuring device lies in the fact that this is suitable for the purpose of determining without contact the bending angle of a sheet metal part that is to be bent, whereby the bending angle measuring device has no moving components. By this means the maintenance effort required for operation of the bending angle measuring device is minimised. Furthermore, by this means the bending angle measuring device has an increased service life, or more particularly a reduced susceptibility to defects, since as a result of the avoidance of moving components mechanical wear is avoided, as is the requirement for actuators. Particularly when employing an axisymmetric body with a reflecting surface the light reflected from the sheet metal part can easily be projected onto the optical means of detection, so as to be able to determine the current angular location of the sheet metal part with a high level of accuracy.

Furthermore, it can be beneficial if the light-detecting surface of the optical means of detection is designed to be two-dimensional and is arranged standing normal to the central axis of the axisymmetric body, whereby the centre of the light-detecting surface of the optical means of detection is preferably located on the central axis of the axisymmetric body. Here it is of advantage if the light beam, which is reflected from the axisymmetric body can be directed directly onto the light-detecting surface of the optical means of detection, whereby the light-detecting surface is arranged such that the light beam can optically be well represented, so as to be able to derive the current bending angle from the latter.

Furthermore, provision can be made for the illumination device, the axisymmetric body and the optical means of detection to be arranged on a common axis, in particular, one that is parallel to the bending line. Here it is of advantage if by this means a simple beam guidance is possible, since apart from the axisymmetric body no additional optical means of deflection are required in order to direct the beams emitted from the illumination device onto the optical means of detection, and thereby to illustrate the current bending angle of the sheet metal part.

In accordance with a further development it is possible that on the bending angle measuring device a beam splitter is arranged at an angle of 45°, or a first mirror is arranged at an angle of 45° to the central axis of the axisymmetric body, whereby the centre of the first mirror preferably lies on the central axis of the axisymmetric body, whereby a first light beam generated by the illumination device at an angle of 90° to the central axis is deflected such that it runs essentially parallel to the central axis of the axisymmetric body, whereby the illumination device is also arranged at an angle of 90° to the central axis. Here it is advantageous that it can thereby be achieved that the bending angle measuring device can be built so as to be as space-saving as possible, so that it can easily be integrated into a bending machine, without thereby hindering the bending process. Furthermore provision can be made for the illumination device to be arranged at an angle other than 90° to the central axis. Here it is important that the first mirror, or the beam splitter, is arranged at an angle halving the angle of the illumination device.

In a further development provision can be made on the bending angle measuring device for a beam splitter or a second mirror to be arranged at an angle of 45° to the central axis of the axisymmetric body, whereby the centre of the second mirror preferably lies on the central axis of the axisymmetric body, whereby the third light beam, deflected by the axisymmetric body and running parallel to the central axis, is deflected at an angle of 90° relative to the central axis, whereby the optical means of detection is also arranged at an angle of 90° to the central axis. Here it is advantageous that it can thereby be achieved that the bending angle measuring device can be built so as to be as space-saving as possible, so that it can easily be integrated into a bending machine, without thereby hindering the bending process. Furthermore provision can be made for the optical means of detection to be arranged at an angle other than 90° to the central axis. Here it is important that the second mirror, or the beam splitter, is arranged at an angle halving the angle of the optical means of detection.

Advantageous is also a development, in accordance with which provision can be made for an essentially point-form light source, such as, for example, an LED, to be embodied in the illumination device. An LED can be simply controlled, and can generate the required light in the smallest space. Furthermore an LED can be designed such that it can be considered to be an approximately point-light source, and not as a surface radiator.

Furthermore provision can be made for the illumination device to comprise a device for purposes of generating a brightness distribution for the first light beam. Here it is of advantage that by means of a light source a particular pattern can be projected onto the surface of the sheet metal part for purposes of generating a brightness distribution, which pattern can be evaluated in the optical means of detection, and can be called upon for purposes of determining the current bending angle.

Furthermore, it can be beneficial for a collimator or a parabolic mirror to be embodied in the illumination device for purposes of generating a parallel beam profile for the first light beam. Here it is of advantage that by this means a directional light beam can be generated in the illumination device, which can be emitted onto the surface of the sheet metal part. By this means a triangulation can be executed, whereby it is hereby possible to calculate the distance from the surface of the sheet metal part to the central axis of the axisymmetric body.

Moreover, provision can be made for the optical means of detection to comprise a two-dimensional image detector. Here it is an advantage that by this means the third light beam recorded by the optical means of detection can be imaged without any distortion, as result of which the evaluation of the generated image, and thereby the determination of the current bending angle, is simplified.

In accordance with a particular development it is possible for the axisymmetric body to be designed as a sphere. Here it is an advantage that in the case of a sphere the central axis can be selected in any manner, that is to say that a sphere has infinitely many central axes arranged in any manner, which central axes pass through the centre point of the sphere. In this manner it is not necessary for the sphere to be accommodated in the bending angle measuring device with a particular alignment. By this means a possible measurement error as a result of an incorrect alignment of the axisymmetric body can be avoided.

In accordance with an advantageous further development provision can be made for the illumination device, the axisymmetric body, and the optical means of detection to be at least partially surrounded by a housing, whereby an opening is provided in the housing in a region of the axisymmetric body. Here it is of advantage that by virtue of the housing any undesirable incursion of light into the measuring system is to a very large extent avoided. In this manner the light intensities recorded by the optical means of detection can be represented as well as possible so as to enable an automated evaluation of the measured results. Furthermore it is advantageous for the housing to have an opening in the vicinity of the axisymmetric body, whereby the light beam can be directed from the axisymmetric body onto the surface of the sheet metal part and back again.

Furthermore, it can be beneficial for a filter disk to be arranged between the illumination device and the axisymmetric body, which filter disk has transparent regions and opaque regions. By means of the filter disk various patterns can be projected on to the sheet, whereby a bending angle can be read off on the basis of the shape of the pattern projected onto the sheet.

In a further development provision can be made for the transparent regions and the opaque regions of the filter disk to be designed in the form of concentric circles. By means of the configuration of the transparent regions and the opaque regions in the form of concentrate circles shadow rings can be generated, which are visible on the sheet surface in the form of hyperbolas.

Furthermore, provision can be made for the individual transparent regions, in particular the rings, to be variously coloured, so that a particular coloured pattern is generated on the sheet surface. This can contribute to a simplified evaluation of the bending angle.

Moreover, provision can be made for a disk aperture to be designed, which is arranged between the illumination device and the optical means of detection, and has aperture openings which are arranged on the outer periphery of the disk aperture, and which extend over an angular segment, whereby an axis of rotation of the disk aperture is located essentially coaxially with the central axis of the axisymmetric body. Such a disk aperture has the advantage that in the case of the measuring method for purposes of measuring a directionally reflecting surface those components of the light can be blocked that do not allow any statement to be made concerning the bending angle.

In addition, provision can be made for a plurality of diaphragm apertures to be distributed over the full circumferential angle, whereby the segmentation of the diaphragm apertures is matched to the resolution accuracy of the optical means of detection. Here it is of advantage for the aperture to be designed so as to be fixed and immovable, and for the aperture to be matched to the requirements of the means of detection.

Furthermore it is possible for a strip aperture to be designed, which is arranged directly in front of the optical means of detection and has a central diaphragm aperture. By means of the central diaphragm aperture those light beams that are of no significance for the determination of the bending angle can be filtered out.

Furthermore a method is provided for determining the bending angle of a sheet metal part, in particular with the use of a bending angle measuring device in accordance with one of the claims 1 to 16, whereby the sheet metal part is deformed by means of a bending machine, whereby, on the sheet metal part a bending edge forms between a first and a second flank, whereby the bending angle measuring device has an illumination device, with at least one light source, and optical means of detection with a light-detecting surface and an axisymmetric body with a central axis and a directional surface, whereby the central axis of the axisymmetric body is arranged so as to be aligned parallel to the bending edge, whereby the determination of the angular location of the two flanks relative to one another comprises at least the following steps:

emission of a first light beam from the illumination device, which first light beam in its path is reflected onto a surface of the sheet metal part, whereby a second light beam is formed, which is reflected onto the surface of the axisymmetric body, so that a third light beam is formed, which is aligned parallel to the central axis of the axisymmetric body and thus parallel to the bending edge, and is deflected, as required, either directly or by way of further deflection, onto the light-detecting surface of the optical means of detection;

detection of the third light beam by means of the optical means of detection; —evaluation of the third light beam recorded by the optical means of detection, and, from this, calculation of the current angular location of the first and/or second flank of the sheet metal part.

Here it is of advantage that by means of the method the bending angle of a sheet metal part can be determined without contact, whereby the bending angle measuring device for purposes of determining the bending angle does not require any moving components. By this means the maintenance effort required for operation of the bending angle measuring device is minimised. Furthermore, by this means the bending angle measuring device has an increased service life, or more particularly a reduced susceptibility to defects, since as a result of the avoidance of moving components mechanical wear is avoided, as is the requirement for actuators. Particularly when employing a rotationally symmetric body with a reflecting surface, the light reflected from the sheet metal part can easily be projected onto the optical means of detection, so as to be able to determine the current angular location of the sheet metal part with a high level of accuracy.

In particular, it can be advantageous for the first light beam to be generated by an essentially point-form light source, such as, for example, an LED, for it to be aligned parallel to the central axis of the axisymmetric body, and for the radiation emanating from the illumination device to be beamed onto the axisymmetric body, whence it is reflected and directed onto the surface of the sheet metal part. Here it is of advantage that an LED can be simply controlled, and can generate the required light in the smallest space.

Furthermore, it can be beneficial for the first light beam, after emission from the light source, to be formed into an essentially parallel light bundle by means of a collimator or by means of a parabolic mirror. Here it is of advantage that by this means a directional light beam can be generated in the illumination device, which can be emitted onto the surface of the sheet metal part, and can be reflected from the latter, and recorded by the optical means of detection, without the light beam becoming distorted and thus not being correctly displayed. By this means a triangulation can be executed, whereby it is hereby possible to calculate the distance from the surface of the sheet metal part to the central axis of the axisymmetric body.

In addition provision can be made for the third light beam, by means of a second mirror or beam splitter arranged at an angle of 45° to the central axis of the axisymmetric body, to be deflected through 90°, so that it impinges on the light-detecting surface of the optical means of detection arranged at an angle of 90° to the central axis of the axisymmetric body. Here it is advantageous that it can thereby be achieved that the bending angle measuring device can be built so as to be as space-saving as possible, so that it can easily be integrated into a bending machine, without thereby hindering the bending process. Furthermore provision can be made for the third light beam to be deflected by a second mirror, or beam splitter, arranged at an angle other than 45° relative to the central axis. Here the first light beam is reflected at double the angle of the arrangement of the second mirror, or beam splitter, whereby the optical means of detection is also arranged at this doubled angle relative to the central axis.

Furthermore provision can be made for the illumination device to be aligned such that the first light beam is emitted at an angle of 90° to the central axis of the axisymmetric body, whereby the first light beam is deflected by means of a first mirror, or beam splitter, arranged at an angle of 45° to the central axis of the axisymmetric body, so that it is aligned essentially parallel to the central axis of the axisymmetric body, and is directed onto the axisymmetric body. Here it is advantageous that it can thereby be achieved that the bending angle measuring device can be built so as to be as space-saving as possible, so that it can easily be integrated into a bending machine, without thereby hindering the bending process. Furthermore provision can be made for the third light beam to be deflected by a second mirror, or beam splitter, arranged at an angle other than 45° relative to the central axis. Here the first light beam is reflected at double the angle of the arrangement of the second mirror, or beam splitter, whereby the optical means of detection is also arranged at this doubled angle relative to the central axis.

Furthermore provision can be made for the luminosity of the third light beam incident onto the optical means of detection to be determined, whereby the third light beam impinges on the light-detecting surface in the form of a circular area, whereby a maximum or a plurality of maxima of the luminosity within the circular area is or are determined, and in each case by connection of the maximum of the luminosity and the central point of the circle by means of a straight line, the current bending angle of the sheet item is derived, since the straight line stands at right angles to the surface of the sheet metal part. Here it is of advantage that the current bending angle of the sheet metal part can be measured and calculated by means of this measurement and calculation method. The straight line, which is drawn between the centre point of the circle and the light maximum, therefore stands normal to the sheet surface, since that optical path of the light beam which impinges at right angles onto the sheet surface, is also reflected from the latter again at right angles, and thus at this point in the circle an intensity maximum occurs for the light incident on the light-detecting surface of the optical means of detection. This method is particularly well suited to the determination of the current bending angle on a sheet metal part with a good reflecting surface.

Furthermore, it can be beneficial that, by means of triangulation by way of the radial distance of the maximum of the luminosity in the circular area from the centre point, and by way of a radius of the axisymmetric body designed as a sphere, the distance from the surface of the sheet metal part to the central axis of the axisymmetric body is calculated. Here it is of advantage that by this means the measured result for the bending angle can be checked by way of the geometric relationships in the bending tool, whereby the measured result is generated in a redundant manner.

Finally provision can be made for the first light beam from a light source of the illumination device to be projected with a strip-form brightness distribution onto the surface of the sheet metal part, whereby the second light beam reflected from the surface impinges onto the axisymmetric body, and is reflected from the latter as a third light beam, and is directed onto the light-detecting surface of the optical means of detection, whereby the third light beam impinges onto the light-detecting surface in the form of a circular area, on which the strips reflected from the sheet metal part are projected onto the circular area with an angular separation from one another, whereby the current bending angle is calculated, in that the angular separation of the individual strips is determined in the circular area. An advantageous embodiment of the method can be implemented in that, in the case of a strip projection, the strips are projected onto the sheet surface with the same normal separation relative to one another. This can be implemented with the aid of a parabolic mirror or a collimator. If the normal separation between the strips remains the same with different luminosity on the surface of the sheet work piece, then in the projected representation of the strips on the optical means of detection, each region of the circular area at right angles onto the sheet surface aligned, in which the strips on the periphery of the circle have a maximum distance from one another. The physical effect that underlies this is explained in more detail in the description of the figures.

In addition provision can be made for the first light beam from the illumination device to be emitted onto a filter disk, which filter disk has transparent regions and opaque regions, which in particular are designed in the form of concentrated circles, as result of which rings with a brightness distribution are projected onto the axisymmetric body, and from there onto the surface of the sheet metal part, whereby the brightness distribution can be seen on the surface of the sheet metal part in the form of hyperbolas, whereby a vertex of one hyperbola marks the right angle of the sheet surface onto the central axis of the axisymmetric body, and these vertices of the hyperbolas are visible as maxima in the optical means of detection. Here it is of advantage that the bending angle can be recorded by means of this method, particularly in the case of sheets with diffuse sheet surfaces.

In an alternative variant provision can also be made for the brightness distribution to be generated in that non-reflecting regions or elements such as, for example, coatings, imprints, etchings or similar are present on the reflecting surface of the axisymmetric body; these do not reflect the incident light, or reflect the latter only slightly. Such non-reflecting regions can, for example, be designed in the form of rings arranged so as to be concentric with the central axis.

Furthermore, it can be beneficial for optics to be designed in the region of the filter disk, which collimate or especially shape the light beams so that they generate a brightness distribution in a prescribed pattern on the sheet surface. By way of this pattern the bending angle can then be evaluated.

For purposes of a better understanding of the invention, the latter is elucidated in more detail with the aid of the following figures.

Here, in a highly simplified schematic representation in each case:

FIG. 4 shows a cross-sectional representation of the bending angle measuring device;

FIG. 5 shows a representation of the result displayed on the image detector;

FIG. 8 shows a cross-sectional representation of the bending angle measuring device with an illumination device and optical means of detection on the same side;

FIG. 9 shows a cross-sectional representation of the bending angle measuring device with a mirror;

FIG. 12 shows a cross-sectional representation of the bending angle measuring device with a mirror in the region of the illumination device;

FIG. 13 shows a cross-sectional representation of the bending angle measuring device with a mirror in the region of the optical means of detection;

FIG. 14 shows a cross-sectional representation of the bending angle measuring device with two mirrors in the region of the optical means of detection;

FIG. 29 shows a cross-sectional representation of a further variant of embodiment of the bending angle measuring device with a strip aperture and two axisymmetric bodies;

FIG. 30 shows a side view of the further variant of embodiment of the bending angle measuring device with a strip aperture and two axisymmetric bodies.

By way of introduction, it should be noted that, in the variously described forms of embodiment, the same parts are provided with the same reference symbols, that is to say, the same component designations, whereby the disclosures in the entire description can correspondingly be transferred to identical parts with the same reference symbols, that is to say, the same component designations. Also, the positional details selected in the description, such as, e.g., top, bottom, side, etc., are related to the immediately described and illustrated figure, and in the event of a change in position these positional details are to be correspondingly transferred to the new position.

Figure 1:
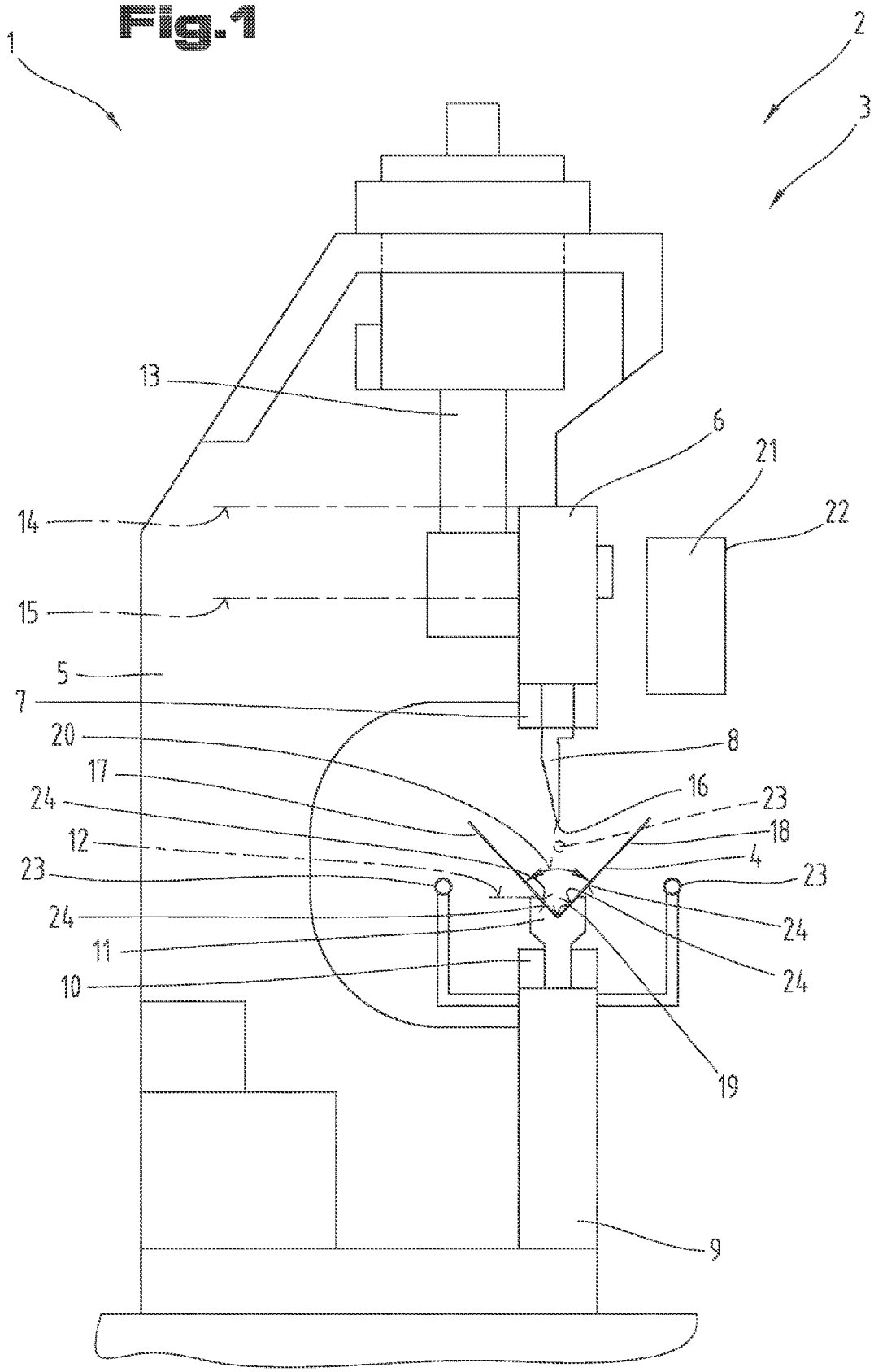
FIG. 1 shows a side view of a structure of a processing plant.

FIG. 1 shows in a schematic representation the side view of a processing plant 1. The processing plant 1 comprises a bending machine 2, such as for example a bending press 3, which is provided for purposes of bending a sheet metal part 4.

The bending press 3 comprises an upper adjustable press beam 6 arranged on a machine frame 5, in which a first tool holder 7 is embodied for purposes of accommodating a bending punch 8. The bending press 3 further comprises a lower stationary press beam 9 on which is embodied a second tool holder 10 for purposes of accommodating a bending die 11, which in the bending process is aligned with the bending punch 8.

For purposes of bending the sheet metal part 4 that is to be bent is laid on to a sheet support surface 12 of the second bending die 11. The bending punch 8, or rather, the upper adjustable press beam 6, is moved by means of a press drive unit 13 in the vertical direction upwards and downwards respectively, whereby the upper press beam 6, together with the therein accommodated bending punch 8, are moved between an upper end position 14 and a lower end position 15. By means of this displacement motion the sheet metal part 4, positioned between bending punch 8 and bending die 11, can be deformed, whereby the bending punch 8 presses the sheet metal part 4 into the bending die 11. In particular a working edge 16 of the bending punch 8 is pressed onto the sheet metal part 4, such that the sheet metal part 4 bends and a first flank 17 and a second flank 18 are formed, whereby during the bending process a bending edge 19 is formed between the two flanks 17, 18. During the bending process, in particular for as long as the bending punch 8 is pressing onto the sheet metal part 4, the bending edge 19 is coincidently located with the working edge 16 of the bending punch 8. As a result of the bending process the two flanks 17, 18 are bent towards one another at a bending angle 20.

Furthermore provision can be made for a computer unit 21 to be embodied for purposes of controlling the press drive unit 13; the computer unit 21 can be coupled to an input unit and/or display unit 22.

As can also be seen from FIG. 1, a bending angle measuring device 23 is provided, which is embodied for purposes of contactless measurement of the current bending angle 20. Here the measurement of the bending angle 20 is undertaken by means of an optical detection of the surface 24 of the sheet metal part 4. There are a number of options as to how the surface 24 of the sheet metal part 4 can be detected, in order to determine the bending angle 20. Accordingly, there are also a number of different options as to how the bending angle measuring device 23 can be arranged on the bending machine 2. For example, as represented in FIG. 1, it is conceivable for the bending angle measuring device 23 to be arranged on the machine frame 5, whereby two bending angle measuring devices 23 are provided; these detect the surface 24 of the first flank 17 and the second flank 18 of the sheet metal part 4 respectively. Here it is of advantage that the two bending angle measuring devices 23 can just be attached onto the machine frame 5, and do not have any negative influence on the bending process. Here the bending angle 20 is calculated from the measured locations of the first flank 17 and the second flank 18 respectively.

In a further variant provision can be made for only one bending angle measuring device 23 to be embodied; the latter is integrated into the bending punch 8, or is arranged in the region of the bending punch 8, and can detect simultaneously the location of both the first flank 17 and the second flank 18 of the sheet metal part 4, as a result of which the bending angle 20 can be calculated.

Since the bending angle measuring device 23, which is subsequently described in more detail below, can be positioned at various positions in the region of the sheet metal part 4, it is also conceivable for the bending angle measuring device 23 to be deployed in various types of bending machines 2. The deployment of the bending angle measuring device 23 in a swivel bending machine is, for example, conceivable. Here the bending angle measuring device 23 can be deployed in the region of the upward swivelling bending arm, in order to determine the bending angle.

Figure 2:
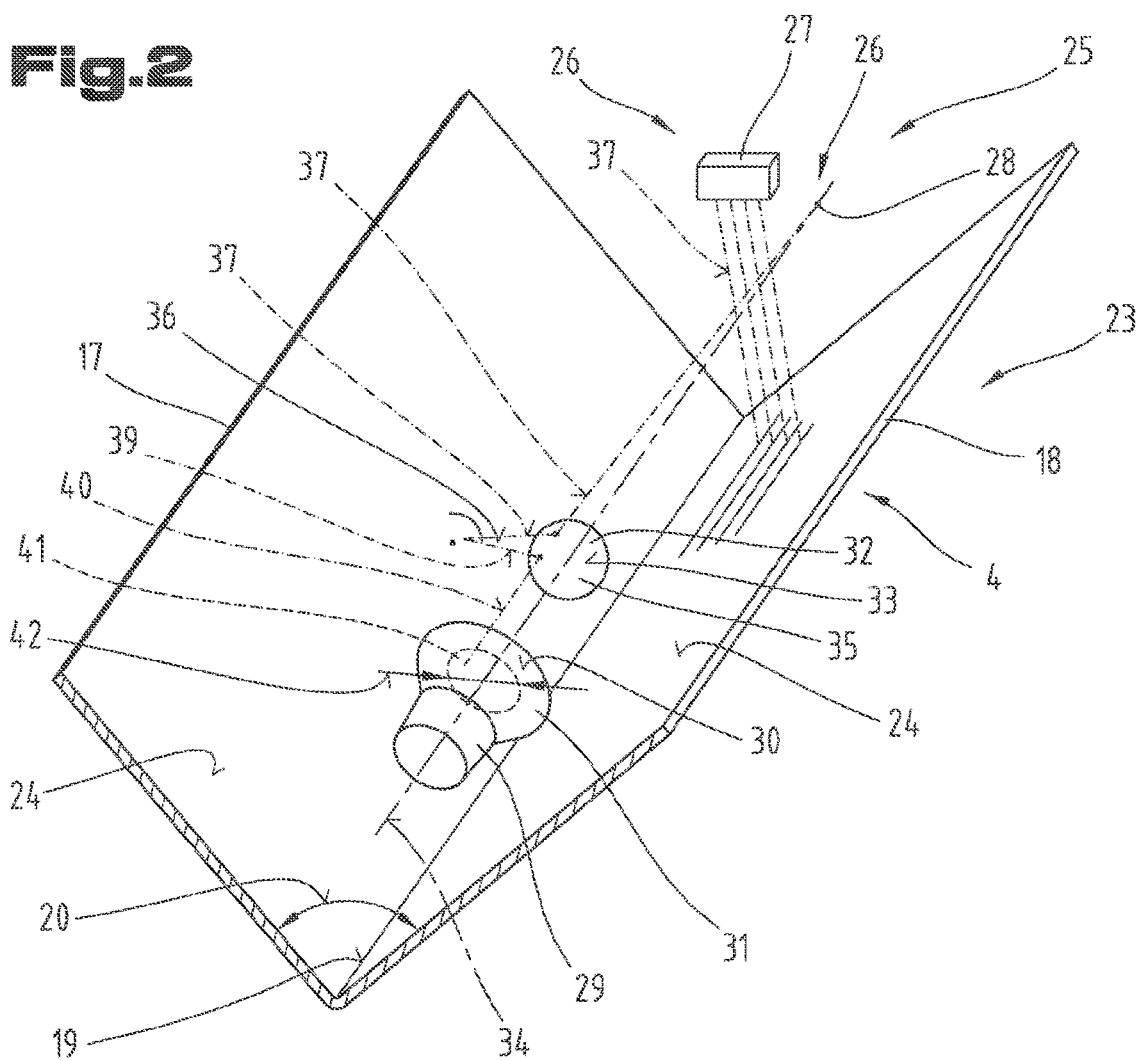
FIG. 2 shows a perspective view of a first variant of embodiment of the bending angle measuring device.

In a schematic representation FIG. 2 shows a perspective view of a first variant of embodiment of the bending angle measuring device 23, whereby the latter is arranged between the two flanks 17, 18, of the sheet metal part 4 facing one another, in order to determine the bending angle 20. As can be seen from FIG. 2, the bending angle measuring device 23 comprises an illumination device 25, which has at least one light source 26. The light source 26 can, for example, be designed as a device for generating a brightness distribution, such as, for example, a strip projector. Furthermore it is also conceivable for the light source 26 to be designed in the form of a point-form light source 28, such as, for example, an LED. Actual examples of embodiment, that is to say, applications, of the various light sources are given in what follows.

Furthermore, the bending angle measuring device comprises an optical means of detection 29, which has a light-detecting surface 30. The light-detecting surface 30 is preferably embodied in the form of a two-dimensional image detector 31, such as, for example, a CCD sensor (charge coupled device).

The bending angle measuring device 23 furthermore comprises an axisymmetric body 32, which has a reflecting surface 33. In the ideal case the roughness of the surface 33 of the axisymmetric body 32 is here selected, that is to say, embodied, such that compared with the wavelength of the light generated by the light source 26 it has comparatively small-scale roughness structures, that is to say, it is as flat as possible, as a result of which a directional reflection of an incident light beam onto the surface 33 occurs, and the laws of reflection apply. Expressed in other words, the angle of incidence of a light beam incident onto the surface 33 of the axisymmetric body 32 is of equal magnitude to the angle of reflection of a light beam reflected from the surface. Such an axisymmetric body 32 with a reflecting surface 33 can be manufactured, for example, from a metallic material such as stainless steel. Since no mechanical loads are imposed on the axisymmetric body 32, the selection of a suitable material is only limited by the optical properties as described, together with an appropriate resistance to ageing for the surface 33.

The axisymmetric body 32 has a central axis 34, which can also be designated as an axis of symmetry, and about which the surface 33 is axisymmetrically arranged. In order to be able to determine the current bending angle 20 by means of the inventive bending angle measuring device 23, it is necessary for the bending angle measuring device 23 to be aligned in its location relative to the sheet metal part 4 being measured such that the central axis 34 of the axisymmetric body 32 is located parallel to the bending edge 19 of the sheet metal part 4 to be measured. This is achieved by positioning, that is to say, aligning the bending angle measuring device 23 relative to the bending punch 8, whereby care is taken in particular to ensure that the central axis 34 of the axisymmetric body 32 is located parallel to the working edge 16 of the bending punch 8.

As can be seen from FIG. 2, provision can be made for the axisymmetric body 32 to be designed as a sphere 35. This has the advantage that any located, that is to say, selected axis that runs through the centre point of the sphere 35 can represent the central axis 34. By this means correct positioning of the axisymmetric body 32, which is designed in the form of a sphere 35, is eased. Alternatively, it is also possible for a wide variety of other body shapes, such as for example a cone, to be designed as the axisymmetric body 32.

The mode of operation, that is to say, the physical effects, of the bending angle measuring device 23, are explained in more detail below in a comparative study of FIGS. 2 to 4. Here it is assumed that the surface 24 of the sheet metal part 4 also has reflecting properties, so that the laws of reflection apply.

Figure 3:
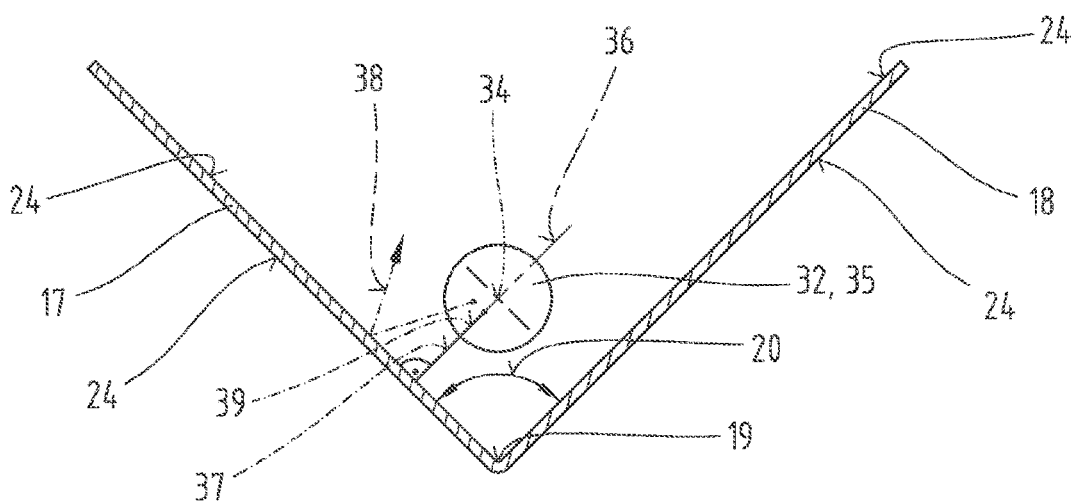
FIG. 3 shows a frontal view of the bending angle measuring device.

In FIGS. 2 to 4 is shown a further and optionally self-contained form of embodiment of the bending angle measuring device 23, whereby for the same parts the same reference symbols, or component designations, are used as in the respectively preceding figures. In order to avoid unnecessary repetition, reference is made to the detailed description in the respectively preceding figures.

FIG. 3 shows a frontal view of the schematically represented structure in FIG. 2, whereby here a plane standing normal to the bending edge 19, that is to say, normal to the central axis 34, has been selected as the viewing plane.

FIG. 4 shows a cross-sectional representation of the bending angle measuring device 23, whereby a plane ε 36 has been selected as the cross-sectional plane, that is to say, the viewing plane; the central axis 34 is arranged on this plane, and the latter is in addition arranged at right-angles to the surface 24 of the sheet metal part 4, in particular to the surface of the first flank 17. The location of the viewing plane is selected so as to be able to describe the function of the bending angle measuring device 23.

In what follows light beams are spoken of in this document for purposes of clarifying the mode of operation of the bending angle measuring device 23. Here it should be stated that when the word light beam is used, the beam path of a light beam is meant and illustrated; this is shown as a beam path relevant to the functionality of the bending angle measuring device 23 in the respective figures, and by means of which the latter are explained. For purposes of simplification or illustration, only this beam path of the light beam is shown or described, which is used for determining the bending angle 20 on the basis of the physical laws of light.

As can be seen from FIGS. 2 to 4, provision can be made for the point-form light source 28 to be arranged such that it is located on the central axis 34. Furthermore, provision can be made for the optical means of detection 29 to be arranged such that it is also located on the central axis 34, whereby the light-detecting surface 30 is arranged standing normal to the central axis.

As can furthermore be seen from FIGS. 2 to 4, in this first example of embodiment of the bending angle measuring device 23 a first light beam 37 is emitted from the light source 26, in particular from the point-form light source 28. Here provision can be made, as represented in this example of embodiment, for the first light beam 37 to be directed onto the surface 33 of the axisymmetric body 32, and to be reflected from the latter. The first light beams 37 emanating from the point-form light source 28 are reflected by the surface 33 of the axisymmetric body 32 in all spatial directions in accordance with the laws of reflection, whereby, as already explained, only that beam path of the light beam 37 is shown that is relevant for measuring the bending angle.

This is that beam path, which as considered in the view in FIG. 3, is radiated from the axisymmetric body 32 at right-angles to the surface 24 of the sheet metal part 4, since this beam path of the first light beam 37 subsequently impinges on the light-detecting surface 30 of the optical means of detection 29 and can thus be evaluated by the image detector 31.

In FIGS. 3 and 4, a non-relevant beam path 38 is shown for illustrative purposes, which impinges on the axisymmetric body 32 and on the surface 24 of the sheet metal part 4 at such an angle that it is reflected such that it cannot be detected by the light-detecting surface 30 of the optical means of detection 29.

The relevant and illustrated beam path of the first light beam 37, which is emitted onto the surface 24 of the sheet metal part 4, is reflected by the surface 24 according to the laws of reflection, and is radiated back onto the axisymmetric body 32 as a second light beam 39. The second light beam 39 is now again reflected by the surface 33 of the axisymmetric body 32, and is radiated as a third light beam 40 onto the light-detecting surface 30. Here the third light beam 40 runs parallel to the central axis 34.

The reflections that are projected by the axisymmetric body 32 as a third light beam 40 onto the light-detecting surface 30, form a varying brightness distribution or light intensity on the light-detecting surface 30, in particular on a circular area 41 on the light-detecting surface 30. A diameter 42 of the circular area 41 on which the relevant light beams 40 can fall, is here the same as a diameter 43 of the axisymmetric body 32.

As already stated, provision can be made, as can be seen from FIGS. 2 to 4, for a centre 44 of the light-detecting surface 30 to be located on the central axis 34, and for the light-detecting surface 30 to be arranged standing normal to the central axis 34. By this means it can be achieved that on the one hand a central point 45 of the circular area 41 is located concentrically with the centre 44 of the light-detecting surface 30, and the light beams incident onto the light-detecting surface 30 can be represented free of distortion. As can be seen from a comparative study of FIGS. 2 to 4, that beam path, which is reflected along the plane ε 36 of the surface 24 of the sheet metal part 4, is also that beam path, which represents on the light-detecting surface 30 the current bending angle 20, since it generates a maximum luminosity on the light-detecting surface 30.

In FIG. 5 is shown a further and optionally self-contained form of embodiment of the bending angle measuring device 23, whereby once again for the same parts the same reference symbols, or component designations, are used as in the preceding FIGS. 1 to 4. In order to avoid unnecessary repetition, reference is made to the detailed description in the preceding FIGS. 1 to 4.

In FIG. 5 an exemplary evaluation of the image detector 31 is represented and this will be explained in more detail in what follows.

As can be seen from FIG. 5, one or a plurality of maxima 46 of the luminosity of the light intensity captured by the image detector 31 occur in the circular area 41, which light intensity is generated by the beam path illustrated in FIGS. 2 to 4.

From the physical relationships already described it is known that this relevant beam path is precisely that beam path, which, in the views in FIG. 2 and FIG. 3, is reflected at right-angles onto the sheet metal part 4. Thus, it can be concluded that when the maximum 46 of the luminosity is connected by means of a straight line 47 with the centre point 45 of the circular area 41, this straight line 47 also stands at right-angles to the sheet metal part 4, or rather, to its flanks 17, 18. Thus the bending angle 20, as can be seen from FIG. 5, can also be read off between these two straight lines 47.

As can be seen from the relationships in FIG. 5, the location of the axisymmetric body 32 relative to the surface 24 being measured of the sheet metal part 4, as viewed in the plane from FIG. 3 or FIG. 5, is not relevant for the correct representation of the bending angle.

Thus it is also conceivable, that, as indicated schematically in FIG. 5, the axisymmetric body 32 can be arranged at an arbitrary location, for example, external to the sheet metal part 4. In the case of such an embodiment, however, it is necessary for two axisymmetric bodies, 32, and, on occasion, two image detectors 31, to be arranged on the bending machine 2, whereby a first angle 48 and a second angle 49 are determined, which together yield the current bending angle 20.

Figure 6:
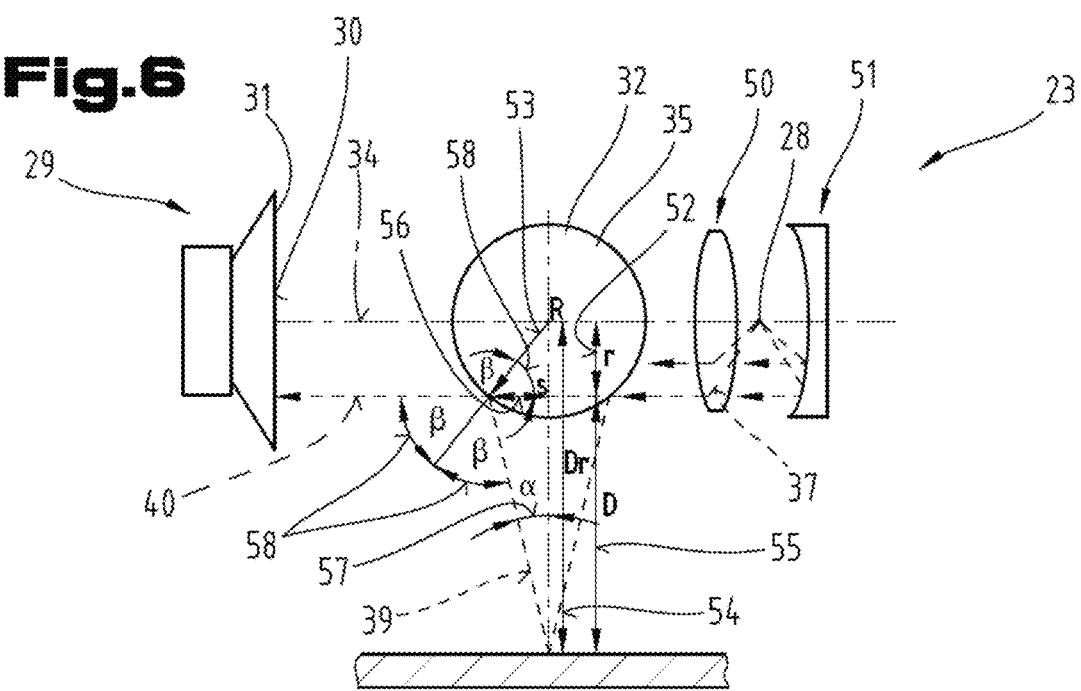
FIG. 6 shows a cross-sectional representation of a further variant of embodiment of the bending angle measuring device with parallel directional first light beams.

In FIG. 6 is shown a further and optionally self-contained form of embodiment of the bending angle measuring device 23, whereby once again for the same parts the same reference symbols, or component designations, are used as in the preceding FIGS. 1 to 5. In order to avoid unnecessary repetition, reference is made to the detailed description in the preceding FIGS. 1 to 5.

FIG. 6 shows the further example of embodiment of the bending angle measuring device 23 in a view corresponding to that of FIG. 4. As can be seen from the representation in FIG. 6, provision can be made, that in addition to the point-form light source 28, the illumination device 25 comprises a collimator 50, or a parabolic mirror 51, by means of which the first light beams 37 emitted from the point-shaped light source 28 are aligned parallel to one another, and thus run parallel to the central axis 34. The collimator 50, or the parabolic mirror 51, are designed as three-dimensional structures, so that the first light beams 37 run not only in the plane, but also in the space parallel to the central axis 34.

By virtue of the arrangement in accordance with FIG. 6, with light beams aligned parallel to one another, it is possible that not only the angular position of the surface 24 of the sheet metal part 4, and from that the bending angle 20, is calculated from a maximum of the luminosity 46 represented in FIG. 5, but also that a distance (D$_r$) 54 from the surface 24 of the sheet metal part 4 to the central axis 34 is calculated by means of triangulation, by means of the distance (r) 52 of the maximum of the luminosity 46 from the centre point 45 of the circular area 41, and with the knowledge of the radius (R) 53 of the sphere 35. The distance (D) 55, the distance (S) 56, the angle ($\alpha$) 57, and the angle of reflection ($\beta$) 58 are introduced as ancillary quantities for the calculation. The relationships in this regard can be seen from a comparative study of FIGS. 5 and 6.

Here the distance (D$_r$) 54 is calculated using the following formula:

$$Dr = \frac{\sqrt{R^2 - r}}{\tan\left(2 * \arcsin\left(\frac{r}{R}\right) - \frac{\pi}{2}\right)} + r$$

The radius 53 of the sphere 35 is between 0.1 and 50 mm, preferably between 0.2 and 10 mm, and in particular between 1 and 5 mm.

As can be seen from FIG. 5, reflections can lead to the fact that a plurality of maxima 46 of the luminosity occur on the light-detecting surface 30, in particular in the circular area 41, whereby some of these maxima 46 occur as undesired disturbances and thus make the readability of the actual bending angle 20 more difficult. Here it can be necessary for a region, or angular segment, in which a local maximum of the luminosity 46 is anticipated, to be restricted in size. This can be implemented in that on the basis of the depth of penetration of the bending punch 8 into the bending die 11, and the known geometry of the bending punch 8 and the bending die 11, together with the known thickness of the sheet metal part 4, an anticipated bending angle 20, or range of angles, can be calculated in advance by the computer unit 21.

The bending process can proceed in such a way that with the aid of the bending angle measuring device 23, the bending angle 20 is detected during the bending process by the optical means of detection 29, in particular by the image detector 31, and is evaluated by the computer unit 21.

This result for the measured bending angle 20 can be called upon for a "design-actual" comparison of the bending angle 20, in order to calculate the necessary over-bending by means of a control cycle in the computer unit 21. Furthermore provision can also be made that when the bending punch 8 is lifted from the sheet metal part 4, after the bending process is complete, a final check of the bending angle 20 is executed by means of the bending angle measuring device 23, and a final bending correction is executed in any further step that may be necessary.

In a further variant it is also conceivable that the bending angle measuring device 23 is not directly coupled to the computer unit 21, but that the bending angle measuring device 23 has its own image processing unit, which, for example, is coupled to the computer unit 21 by means of a network connection.

Figure 7:
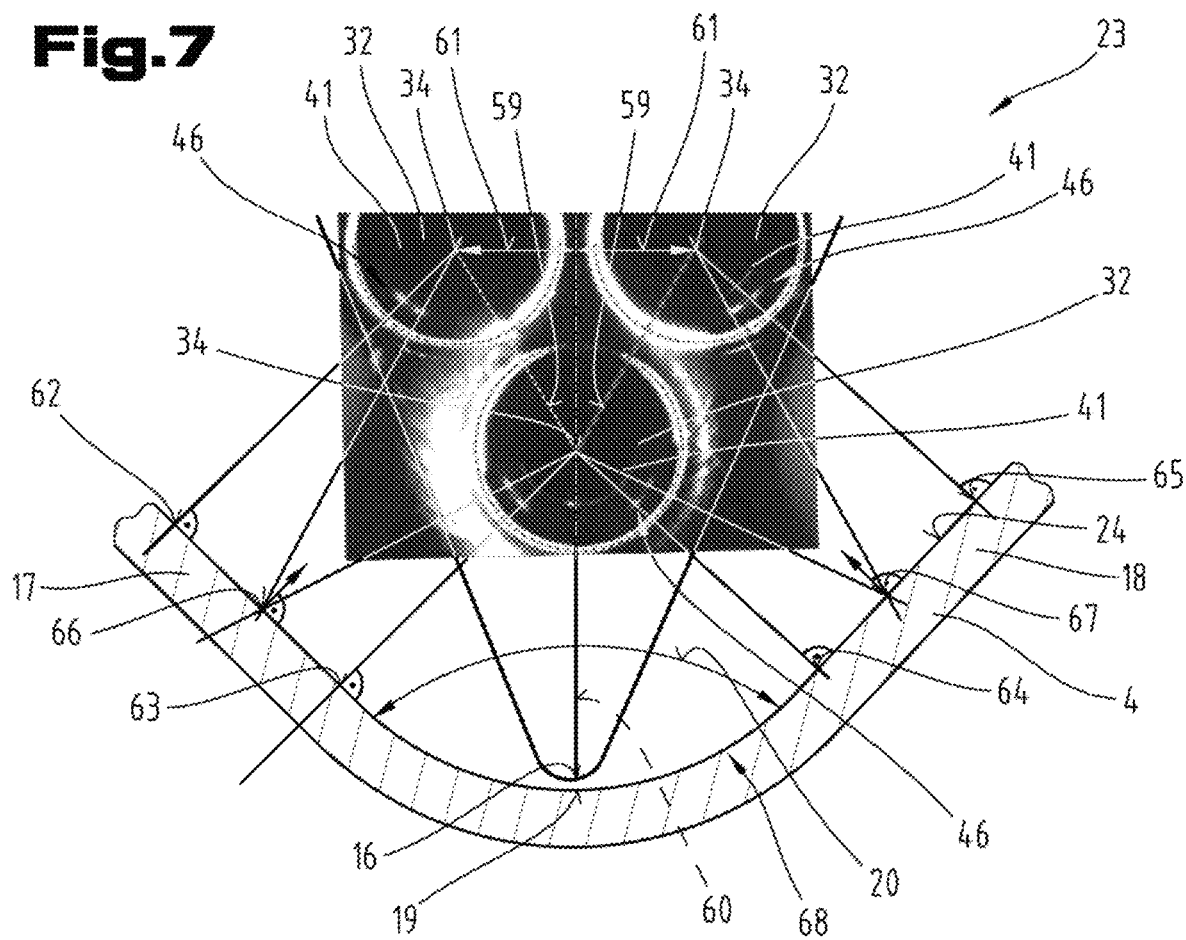
FIG. 7 shows a representation of the result displayed on the image detector when using three axisymmetric bodies.

In FIG. 7 is shown a further and optionally self-contained form of embodiment of the bending angle measuring device 23, whereby here a view, that is to say, a representation, in accordance with FIG. 5, has been selected and whereby once again for the same parts the same reference symbols, or component designations, are used as in the preceding FIGS. 1 to 6. In order to avoid unnecessary repetition, reference is made to the detailed description in the preceding FIGS. 1 to 6.

In the variant of embodiment in FIG. 7 a total of three axisymmetric bodies 32 are installed on the bending angle measuring device 23, whereby each of the axisymmetric bodies is illuminated by its own light source 26. Furthermore, provision can be made for each of the axisymmetric bodies 32 to be detected by its own optical means of detection 29, or for only one optical means of detection 29 to be provided for the common detection and evaluation of the light beams.

In a further development it is also conceivable that additional axisymmetric bodies 32 are arranged in the bending angle measuring device 23.

In the variant of embodiment represented in FIG. 7 the three axisymmetric bodies 32 are arranged located within the two sheet flanks 17, 18, whereby these are arranged at a previously known distance 59, that is to say, at a predefined location, relative to one another. In particular provision can be made for a first axisymmetric body 32 to be arranged with its central axis 34 directly on a plane of symmetry 60 that halves the bending angle 20, and for the two further axisymmetric bodies to be arranged with their central axis 34 in each case removed at a distance 61 from the plane of symmetry 60.

By means of this arrangement the points 62 and 63 of the first flank 17, together with the points 64 and 65 of the second flank 18, can be directly detected, using the above-described method for bending angle measurement.

In addition, further intensity maxima 46 of the luminosity ensue in the three circular areas 41. These come about in each case by the fact that the light beam is reflected by one of the externally located axisymmetric bodies 32 at the points 66 or 67 on the surface 24 of the sheet metal part 4 in accordance with the laws of reflection, and in the circular area 41 of an axisymmetric body 32 located on the plane of symmetry 60 generates a maximum of the luminosity 46. Conversely, the light reflected by the axisymmetric body 32 located on the plane of symmetry 60 is reflected at the points 66 and 67 in accordance with the laws of reflection, and generates a further maximum of the luminosity 46 on the two axisymmetric bodies 32 arranged at a distance 61 from the plane of symmetry 60.

On the basis of the arrangement in accordance with FIG. 7, the measured bending angle 20 can be determined by a plurality of measured points, whereby a possible susceptibility to error in the measured results as a result of contamination or scratches etc. of the surface 24 of the sheet metal part 4 can be reduced. In addition, by means of this arrangement, a straightness of the two flanks 17, 18 can be measured. If the lower axisymmetric body 32 positioned on the plane of symmetry 60 is arranged close enough to the bending edge 19, it is also possible for a bending radius 68 or its shape to be detected and measured.

In FIGS. 8 to 15 are shown further and optionally self-contained embodiment of the bending angle measuring device 23, whereby here a view or a representation according to FIG. 4 has been selected, and the same reference characters or component designations are used as in the respective preceding figures. In order to avoid unnecessary repetition, reference is made to the detailed description in the respectively preceding figures.

Here FIGS. 8 to 11 illustrate embodiments in which the illumination device 25 and the optical means of detection 29 are arranged on the same side as viewed in the viewing plane with respect to a sub-plane that extends from the top downwards and intersects the axisymmetric body 32. Here the axisymmetric body 32 can be designed, for example, as a cone 69.

In the example of embodiment in accordance with FIG. 8, the point-form light source 28 and the optical means of detection 29 are both arranged on the central axis 34. Here the first light beam 37 is emitted from the point-form light source 28, reflected on the axisymmetric body 32 and projected onto the surface 24 of the sheet metal part 4. From there it is reflected and projected back as a second light beam 39 onto the axisymmetric body 32, whereby it is reflected once again by the latter and is projected as a third light beam 40 onto the light-detecting surface 30 of the optical means of detection 29. This arrangement can be advantageous, in that it can be designed in a space-saving manner.

FIG. 9 shows a further possible form of embodiment of the bending angle measuring device 23, whereby in this form of embodiment the optical means of detection 29 and the illumination device 25 are not arranged on the central axis 34 of the axisymmetric body 32, but rather both, as viewed in the viewing plane, are arranged at an angle 70 of 90° to the central axis 34. Here a first mirror 71 is provided, which deflects the light beam. In particular the first mirror 71, as illustrated schematically in FIG. 9, is defined by means of a mirror plane 72. Here the mirror plane 72 is that surface on which incident light is reflected. The mirror plane 72 also extends into the depth of the viewing plane, in order to be able to reflect all light beams emitted from the axisymmetric body 32, and to direct them onto the circular area 41. Provision is preferably made for the mirror plane 72, as viewed in the viewing plane, to be arranged at an angle 73 of 45° to the central axis 34. Provision is preferably made here for the centre 74 of the first mirror 71 to be arranged precisely on the central axis 34. By means of this arrangement of the first mirror 71, i.e. its mirror plane 72, it can be achieved that all the light beams that run parallel to the central axis 34, are deflected through 90° and can be represented in a distortion-free, if reflected, image, on the light-detecting surface 30. Furthermore, provision can be made for the mirror plane 72 of the first mirror 71 to be arranged in the viewing plane at an arbitrary angle 73 to the central axis 34, whereby here the optical means of detection 29 must be arranged in such a way that it is aligned at an angle 70 to the central axis 34, which corresponds to twice the angle 73. This possible arrangement or orientation of the deflecting means for light beams also applies to the further described examples of embodiment, whereby, for the sake of brevity, the subject is not discussed separately for each example of embodiment.

The beam path according to the construction of FIG. 9 takes place as follows: the first light beam 37 is radiated from the point-form light source 28. This is reflected in the first mirror 71, in particular on the mirror plane 72, and is projected onto the axisymmetric body 32, whence it is also reflected and projected onto the surface 24 of the sheet metal part 4. From there it is reflected and projected back as a second light beam 39 onto the axisymmetric body 32, whereby it is reflected once again by the latter and projected as a third light beam 40 by way of a second mirror 76 onto the light-detecting surface 30 of the optical means of detection 29. In the example of embodiment in accordance with FIG. 9, the first mirror 71, which reflects the first light beam 37, and the second mirror 76, which reflects the third light beam 40, are arranged located one above another, and are thus formed as one component, whereby the mirror plane 72 of the mirrors 71, 76 is coincidently located.

Figure 10:
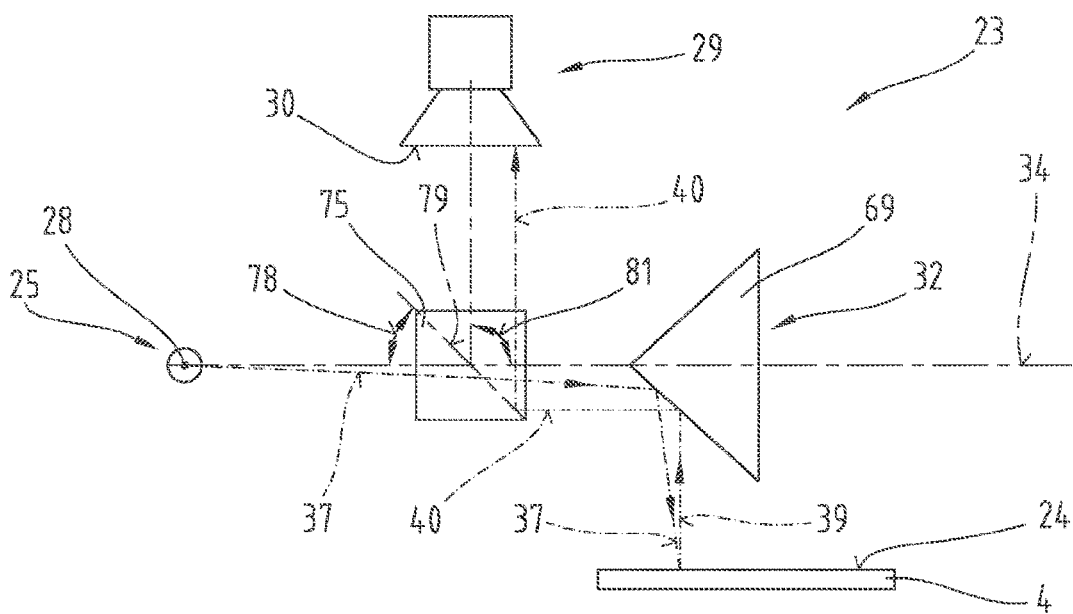
FIG. 10 shows a cross-sectional representation of the bending angle measuring device with a beam splitter.

In FIG. 10 a further example of embodiment of the bending angle measuring device 23 is represented. Here the illumination device 25, in particular the point-form light source 28, is arranged on the central axis 34 of the axisymmetric body 32. The optical means of detection 29, in particular the light-detecting surface 30, are arranged at an angle 70 of 90° to the central axis 34 of the axisymmetric body 32. Furthermore a beam splitter 75 is provided, which splits an incident light beam, whereby one part of the incident light beam is reflected and another part of the incident light beam passes through the beam splitter 75. In particular a splitter plane 79 is embodied in the beam splitter 75, on which the light beam can be reflected, and which is arranged at an angle 78 of 45° to the central axis 34 of the axisymmetric body 32. For illustrative purposes in FIGS. 10 and 11 only that part of the beam path in a beam splitter 75 is represented, which is relevant for the evaluation of the bending angle 20. The respectively split light beam at the beam splitter is not shown in the interests of clarity.

As can be seen from FIG. 10, in this variant of embodiment the first light beam 37 is emitted by the illumination device 25, passes through the beam splitter 75, where it is refracted according to the refractive index of the splitter plane 79, and impinges onto the axisymmetric body 32, whence it is reflected and projected onto the surface 24 of the sheet metal part 4. From the sheet metal part 4 this is reflected as a second light beam 39 and projected back onto the axisymmetric body 32, whence it is reflected once again by the latter and runs as a third light beam 40, which is aligned parallel to the central axis 34. The third light beam 40, is subsequently reflected on the splitter plane 79 of the beam splitter 75, and running at right-angles to the central axis 34, is deflected onto the light-detecting surface 30 of the optical means of detection 29.

Figure 11:
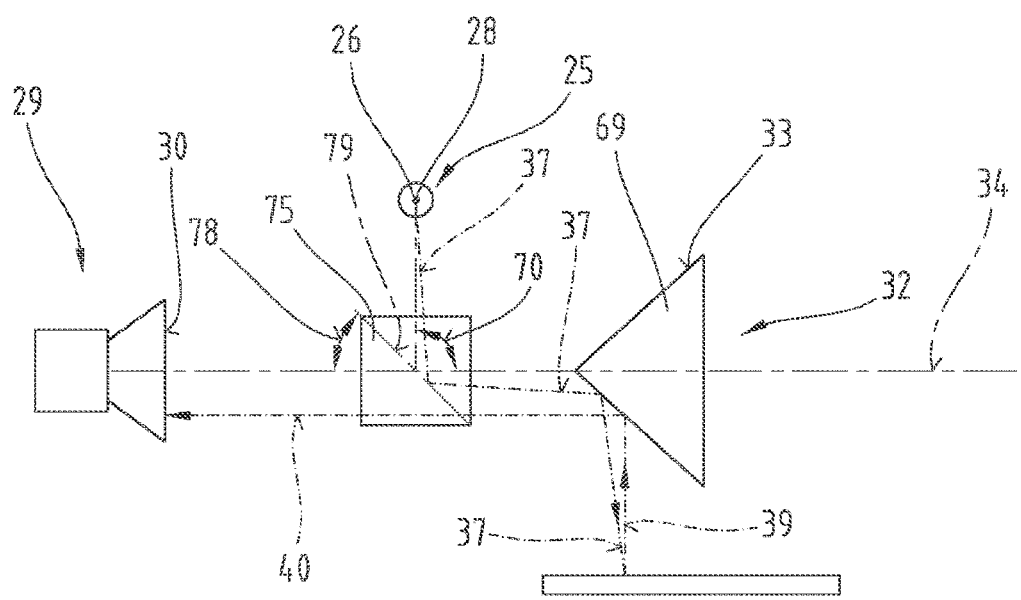
FIG. 11 shows a cross-sectional representation of the bending angle measuring device with a beam splitter and an illumination device arranged in a different manner.

In FIG. 11 is illustrated a further example of embodiment of the bending angle measuring device 23, whereby in this example of embodiment a beam splitter 75 is likewise arranged so as to be able to deflect a light beam in a corresponding manner. In this example of embodiment the illumination device 25, in particular the light source 26, such as, for example, a point-form light source 28, is arranged at an angle 70 of 90° to the central axis 34.

The first light beam 37 emitted from the illumination device 25 impinges onto the splitter plane 79 of the beam splitter 75, whence it is reflected and emitted onto the surface 33 of the axisymmetric body 32. From the axisymmetric body 32, the first light beam 37 is projected in a known manner onto the surface 24 of the sheet metal part 4, and as a second light beam 39 is projected back onto the axisymmetric body 32. Emanating from the axisymmetric body 32, the second light beam 39 is also reflected and projected as a third light beam 40 in the direction of the optical means of detection 29. Here the third light beam is also aligned parallel to the central axis 34 and passes through the beam splitter 75 without diffraction, so that evaluation can be undertaken on the light-detecting surface 30 of the optical means of detection 29.

In FIGS. 12 to 14 are illustrated further embodiments of the bending angle measuring device 23, in which the illumination device 25 and the optical means of detection 29 in the viewing plane are arranged on opposite sides with respect to a sub-plane intersecting the axisymmetric body 32 and running from top to bottom.

In the example of embodiment in accordance with FIG. 12, the first light beam 37 is reflected on the mirror plane 72 of the first mirror 71, and is projected onto the surface 33 of the axisymmetric body 32, whence it is also reflected and is projected onto the surface 24 of the sheet metal part 4. In a manner of similarly known art, the resulting second light beam 39 is once again reflected on the axisymmetric body 32 and as a third light beam 40, which is aligned parallel to the central axis 34, is detected by the optical means of detection 29.

In the example of embodiment in accordance with FIG. 13, the first light beam 37 is projected onto the axisymmetric body 32 and, reflected from the latter, is projected onto the surface 24 of the sheet metal part 4. Reflected from the surface 24 this is projected as a second light beam back onto the axisymmetric body 32. Reflected as a third light beam 40 from the axisymmetric body 32, now running parallel to the central axis 34, this is projected onto the mirror plane 72 of the second mirror 76 and is reflected from the latter, and is deflected at an angle 81 of 90° to the central axis 34 of the axisymmetric body 32. Here the second mirror 76, in particular its mirror plane 72, is arranged at an angle 80 of 45° to the central axis 34.

The example of embodiment in FIG. 14 features both the first mirror 71 for purposes of deflecting the first light beam 37, and also the second mirror 76 for purposes of deflecting the third light beam 40. In the interests of brevity details are not given concerning the exact beam guidance.

Figure 15:
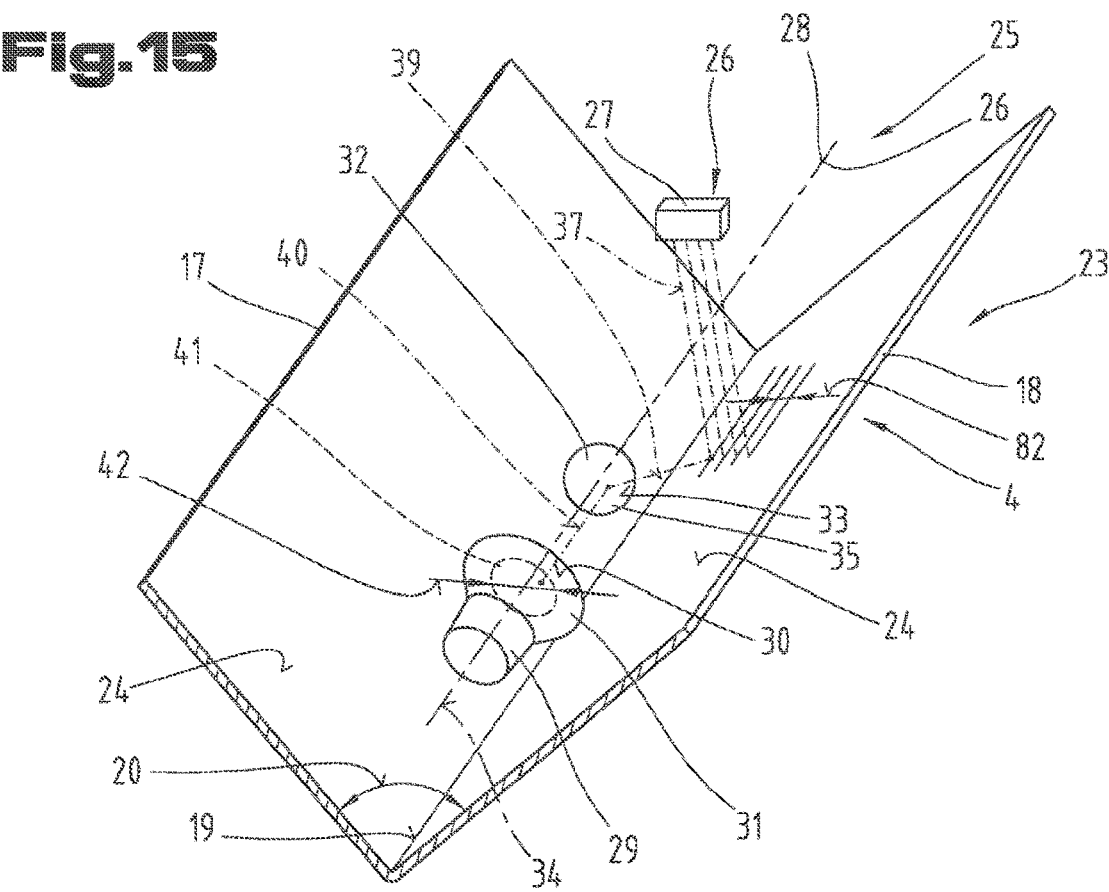
FIG. 15 shows a perspective view of a further variant of embodiment of the bending angle measuring device with a strip projector.
Figure 16:
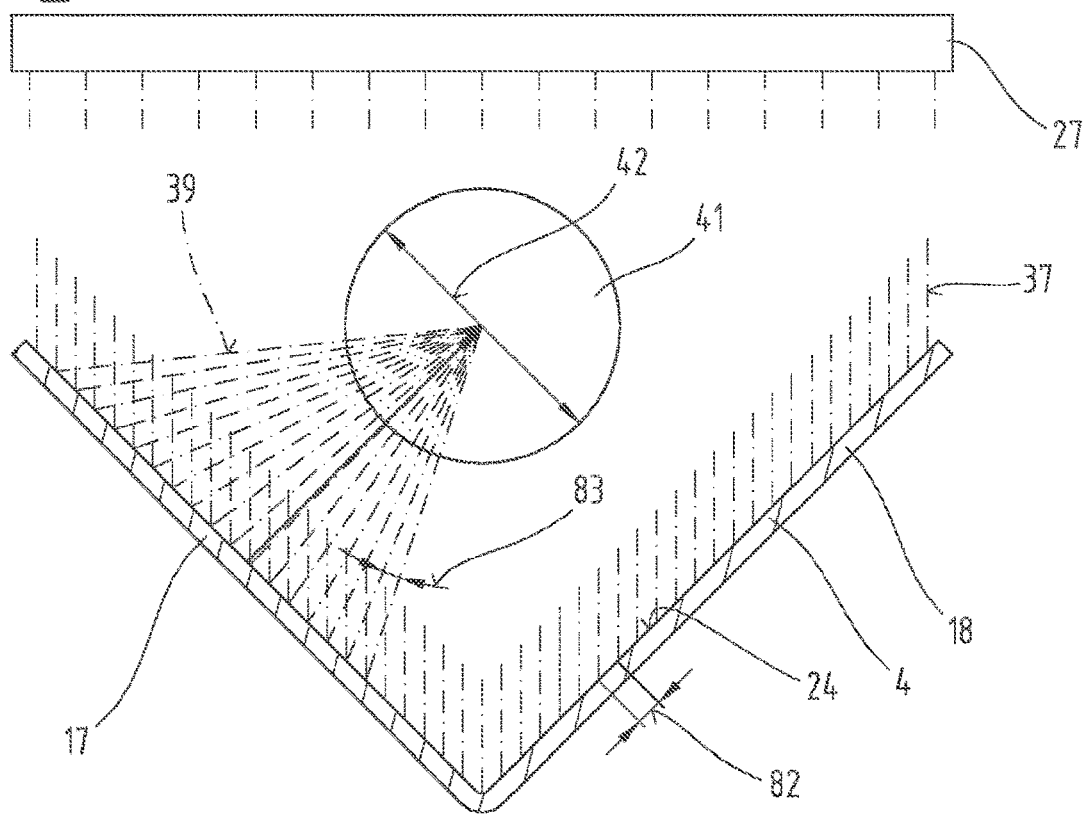
FIG. 16 shows a frontal view of the bending angle measuring device with a strip projector.
Figure 17:
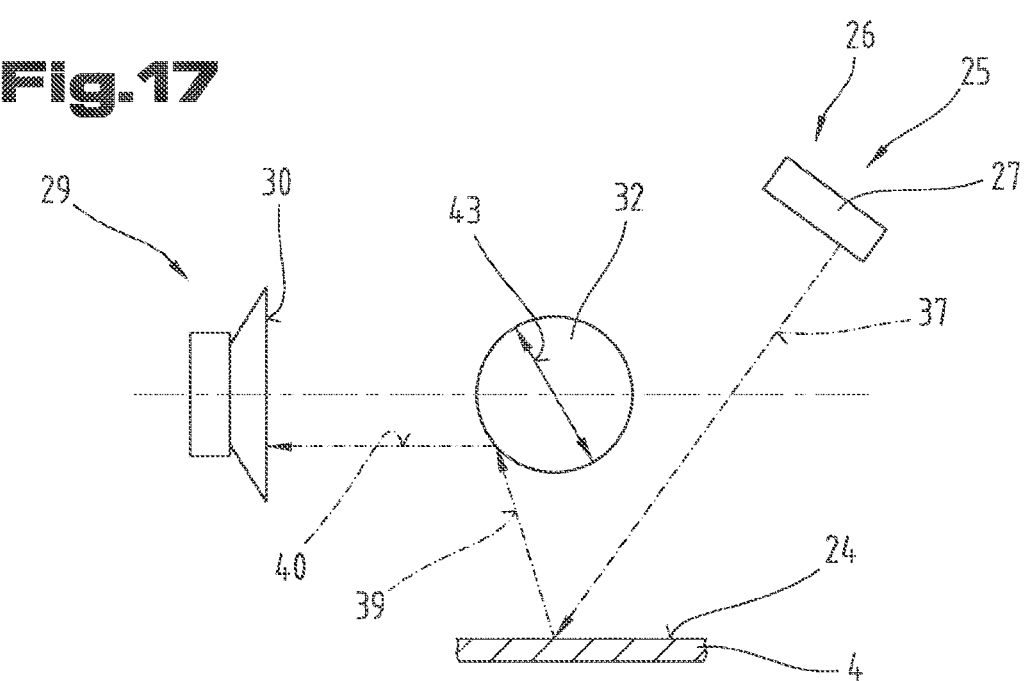
FIG. 17 shows a cross-sectional representation of the bending angle measuring device with a strip projector.

In FIGS. 15 to 17 is shown a further and optionally self-contained form of embodiment of the bending angle measuring device 23, whereby for the same parts the same reference symbols, or component designations, are used as in the each case preceding figures. In order to avoid unnecessary repetition, reference is made to the detailed description in the respectively preceding figures.

In the example of embodiment in accordance with FIGS. 15 to 17, it is assumed that the roughness of the surface 24 of the sheet metal part 4, compared to the wavelength of the light generated by the light source 26, has comparatively large-scale roughness structures, that is to say, is as rough as possible, whereby the result is a diffuse reflection of a light beam incident on the surface 33, and thus the Lambertian radiation law approximately applies.

The illumination device 25 comprises a device 27 for generating a brightness distribution. The device 27 for generating a brightness distribution can, for example, be designed in the form of a strip projector. In order to explain this example of embodiment, it is assumed that the device 27 for generating the brightness distribution, as can be seen in FIG. 16, projects directional light beams onto the surface 24 of the sheet metal part 4, such that a normal spacing 82 of the brightness distribution on the surface 24 of the sheet 4 is the same for all the brightness strips impinging onto the surface 24.

As can easily be seen from a comparative study of FIGS. 15 to 17, the first light beam 37 from the device 27 for generating the brightness distribution is projected onto the surface 24 of the sheet metal part 4 such that longitudinal strips are arranged on the surface 24 of the sheet metal part 4, aligned parallel to the bending edge 19, and that these have a uniform normal spacing 82 relative to one another.

Here by virtue of the rough surface 24 of the sheet metal part 4 the first light beam 37 is not reflected in a directional reflection; rather the first light beam 37 is scattered in a diffuse manner By virtue of this diffuse scattering according to the Lambertian radiation law, not only is a relevant second light beam 39, which is arranged at right-angles to the surface 24 of the sheet metal part 4, projected onto the axisymmetric body 32, but also, as can be seen in FIG. 16, further beams of the brightness distribution are projected onto the axisymmetric body 32 as second light beams 39.

In accordance with the features of the reflecting surface 33 of the axisymmetric body 32, already sufficiently described, the second light beams 39 are projected in accordance with the laws of reflection in a directional reflection from the axisymmetric body 32 as a third light beam 40 onto the light-detecting surface 30 of the optical means of detection 29. Here a circular area 41 is generated on the optical means of detection 29, as already described in the other examples of embodiments; the diameter 42 of the circular area 41 is equal to the diameter 43 of the axisymmetric body 32. The brightness distribution projected onto the circular area 41 is, as can be seen in FIG. 16, visible in the form of a strip pattern in the circular area 41.

Figure 19:
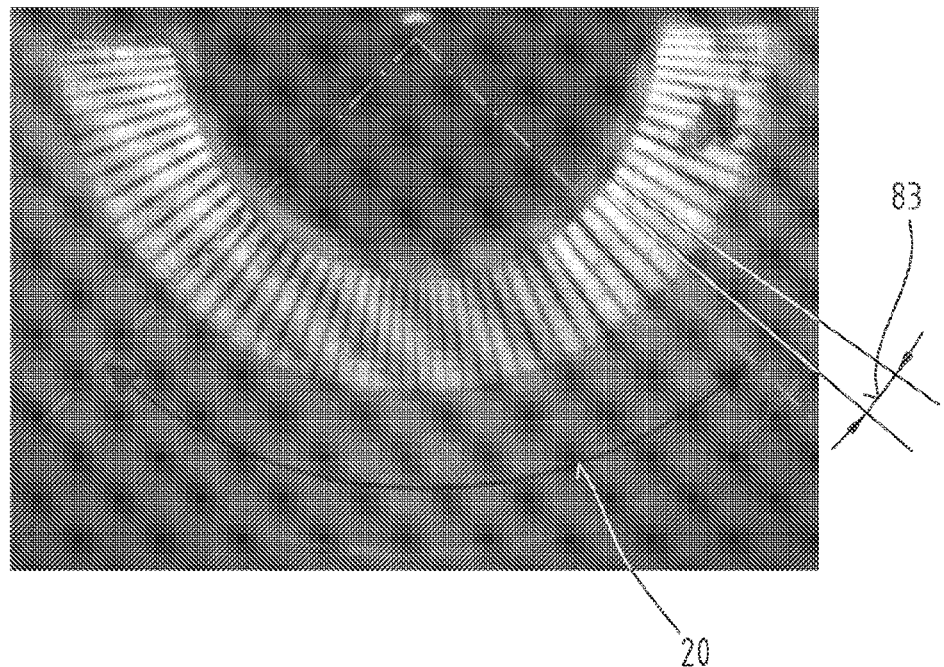
FIG. 19 shows a representation of the result displayed on the image detector of a variant of embodiment with a strip projector.

FIG. 19 shows an example of an evaluation of the image detector 31, whereby the strip pattern in the circular area 41 can easily be seen.

As can be seen from FIG. 16 and FIG. 19, the individual brightness distributions are distributed onto the circular area 41 with an angular separation 83. Here the size of the angular separation 83 between two adjacent second light beams 39 differs over the periphery of the circular area 41. This results from the geometric relationships as shown in FIG. 16. Here it can be determined that those second light beams 39, which are located in the region of the right angle to the surface 24 of the sheet metal part 4, have the greatest angular separation 83 relative to one another. From this finding, the circular area 41 can be used to determine the circular segment that stands at right-angles to the surface 24 of the sheet metal part 4, by evaluating the angular separation 83 of the brightness distributions projected onto the circular area 41. Such an evaluation is illustrated in an exemplary manner in FIG. 20, whereby a developed view of the brightness distributions projected onto the circular area 41 is illustrated. Over the said developed view of the brightness distributions is plotted the profile of the linear separation. From FIG. 20 it can be seen that the profile of the linear separation has two maxima. By virtue of the above-described relationships, the current bending angle 20 can be precisely read off between these two maxima of the angular separation 83.

A particular advantage of this measuring method, that is to say, of this example of embodiment in accordance with FIGS. 15 to 17, is that sheets with a poorly reflecting surface, or sheets with local defects or unevennesses, can easily be measured with respect to their bending angles.

In an example of embodiment, which is not represented further, it is also possible in accordance with the above-described measuring method for the device 27 for generating a brightness distribution not to emit any parallel-directional first light beams 37, but instead the first light beam 37 is generated in an approximately point-form light source, and in this manner the normal separation 82 between the various brightness strips on the surface 24 of the sheet metal 4 differs in size. Here it is necessary that in the evaluation of the measured result, in particular of the angular separation 83, the distortion of the normal separation 82 be taken into account, as a result of which the representation of the angular separation 83 in the circular area 41 is also distorted. As a result the current bending angle 20 is not precisely to be read off between the two maxima of the angular separation 83, but rather the distortion is to be introduced into the calculation by way of calculation methods.

Furthermore, it is also conceivable that both the measuring methodology for determining the bending angle 20 by means of a point-form light source 28, as described in FIGS. 2 to 4, as well as the measuring method using a device 27 for generating a brightness distribution as described in FIGS. 15 to 17, are applied. Here it can be advantageous that different types of sheet metal parts 4 with different surface characteristics can easily be measured during the bending process with regard to their current bending angles 20, and that the measured results of the two measuring methods can be mutually checked and compared.

Since the reflection behaviour, that is to say, whether directional reflection or diffuse reflection occurs, depends on the ratio of the wavelength of the light beam incident on the surface to the roughness of the surface, it can be useful if, for the measuring methodology according to FIGS. 2 to 4, a light with a long wavelength, such as, for example, infrared light, is used to generate a directional reflection as far as possible on the surface 24 of the sheet metal part 4, and if the device 27 for generating a brightness distribution emits a light with a short wavelength, for example an ultraviolet light, for the measurement methodology in accordance with FIGS. 15 to 17, to obtain a diffuse radiation which is as diffuse as possible on the surface 24 of the sheet metal part 4.

Figure 18:
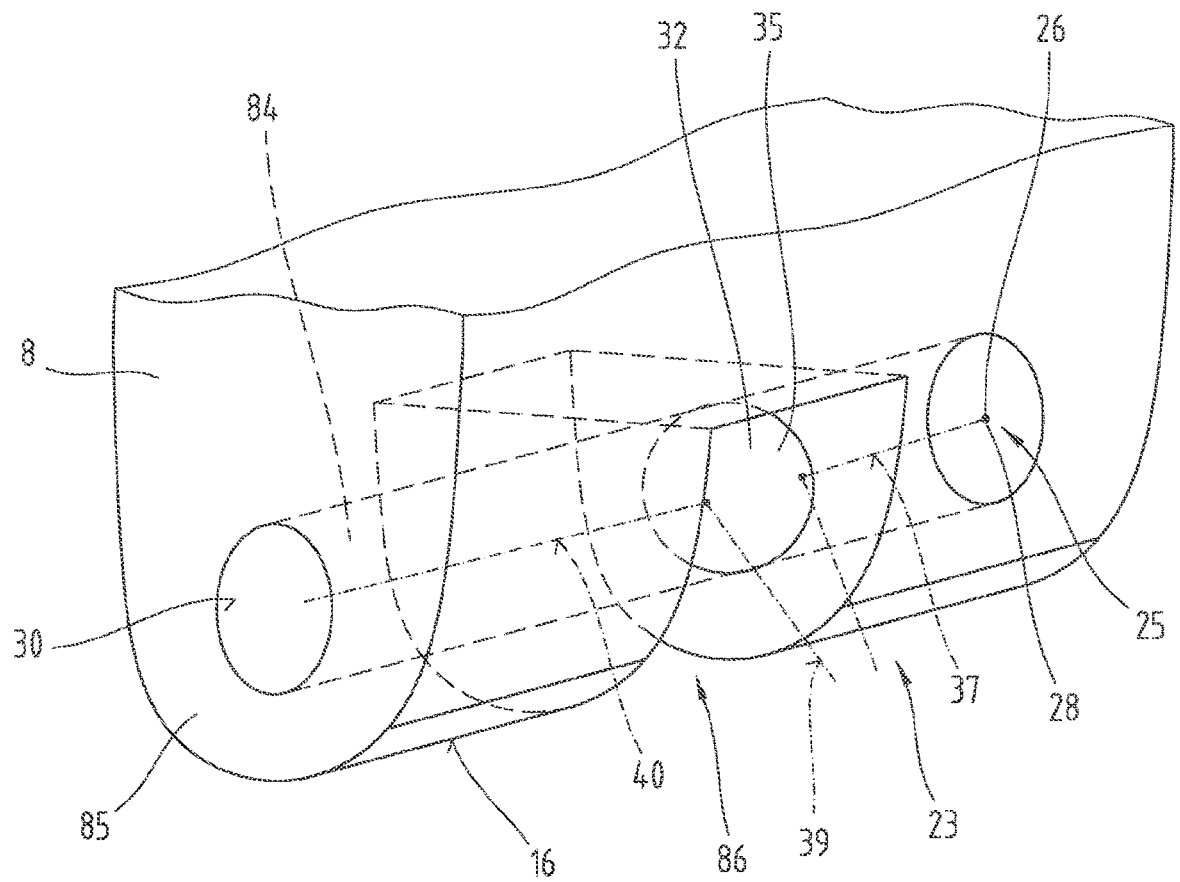
FIG. 18 shows a perspective view of a further variant of embodiment of the bending angle measuring device, which is integrated into a bending punch.

FIG. 18 shows a perspective view of a bending punch 8, in particular the operating region of the bending punch 8, on which the working edge 16 is arranged, whereby the bending angle measuring device 23 is integrated into the bending punch 8. In particular provision can be made for a bore 84 running parallel to the working edge 16 to be introduced into the bending punch 8; the light source 26, in particular a point-form light source 26, together with the axisymmetric body 32, are introduced into the bore 84. Here the bending punch 8 serves at the same time as a housing 85, so that the bending angle measuring device 23 is protected from undesirable incident light and other environmental influences. In order to enable the entry and/or exit of the relevant light beam for purposes of determining the bending angle 20, an opening 86 is provided, in which the axisymmetric body 32 is accommodated.

As an alternative to this variant of embodiment in accordance with FIG. 18, it is also conceivable that the housing 85 is formed by a simple tubular body, so that the bending angle measuring device can be positioned independently of the bending punch 8 on the bending machine 2.

Figure 20:
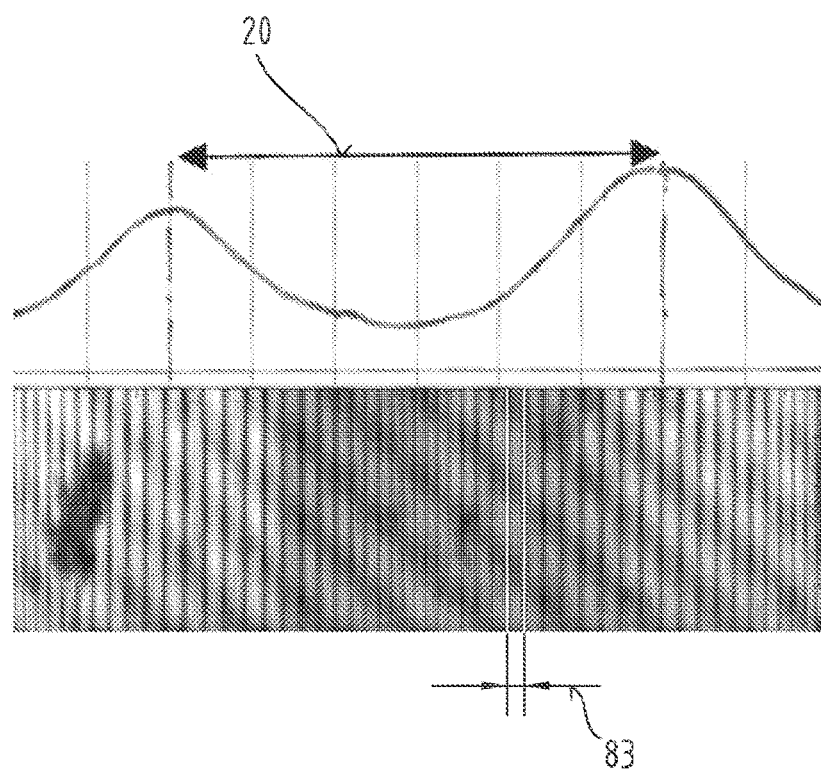
FIG. 20 shows a developed view of the strips in FIG. 19.
Figure 21:
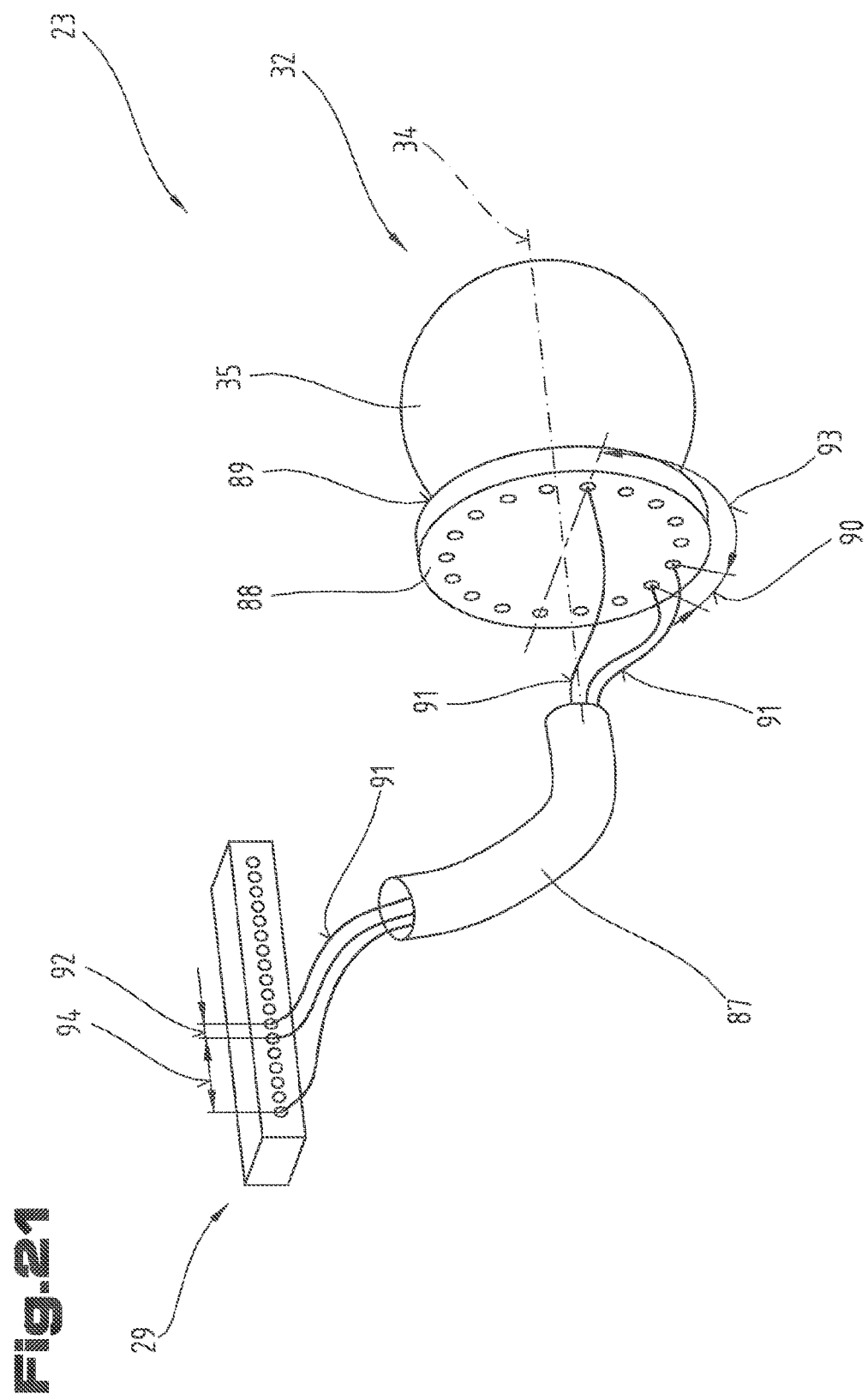
FIG. 21 shows a perspective view of a variant of embodiment with a fibre optic cable for purposes of guiding the third light beam.

In FIG. 21 is shown a further and optionally self-contained form of embodiment of the bending angle measuring device 23, whereby for the same parts the same reference symbols, or component designations, are used as in the preceding FIGS. 1 to 20. In order to avoid unnecessary repetition, reference is made to the detailed description in the preceding FIGS. 1 to 20.

In the possible variant of embodiment represented in FIG. 21 the third light beam 40 is not directed directly onto the optical means of detection 29, but rather a fibre optic cable 87 is arranged between the axisymmetric body 32 and the optical means detection 29. Here provision can be made for the fibre optic cable 87 to have a light input module 88, whereby the third light beam 40 is projected onto a circular input surface 89 of the light input module 88. On the input surface 89 a plurality of fibres 91 are arranged in an even circular angular separation 90. The individual fibres 91 of the fibre optic cable 87 direct the third light beam 40 impinging in each case onto the optical means of detection 29. Here the optical means of detection 29 can be designed one-dimensionally, whereby the individual fibres 91 are arranged on the optical means of detection 29 in the form of a line with a separation 92 between one another. The current bending angle 20 can be measured or calculated by way of the currently illuminated fibre 91, and thus in the context of an absolute angle 93, that is to say, the corresponding assignment on the optical means of detection 29, by means of an absolute distance 94. An advantage of this variant of embodiment is that the optical means of detection 29 can be arranged in a space-saving manner on the bending angle measuring device 23 so as not to influence the bending process. Furthermore it is of advantage that such a linear optical means of detection 29 can be simply constructed.

In a further example of embodiment, which is not shown, provision can be made for the first light beam 37 generated in the illumination device 25 also to be guided onto the sheet metal part 4 or the axisymmetric body 32 by means of a fibre optic cable.

In FIGS. 22 to 25 is shown a further and optionally self-contained form of embodiment of the bending angle measuring device 23, whereby for the same parts the same reference symbols, or component designations, are used as in the preceding FIGS. 1 to 21. In order to avoid unnecessary repetition, reference is made to the detailed description in the preceding FIGS. 1 to 21.

Figure 22:
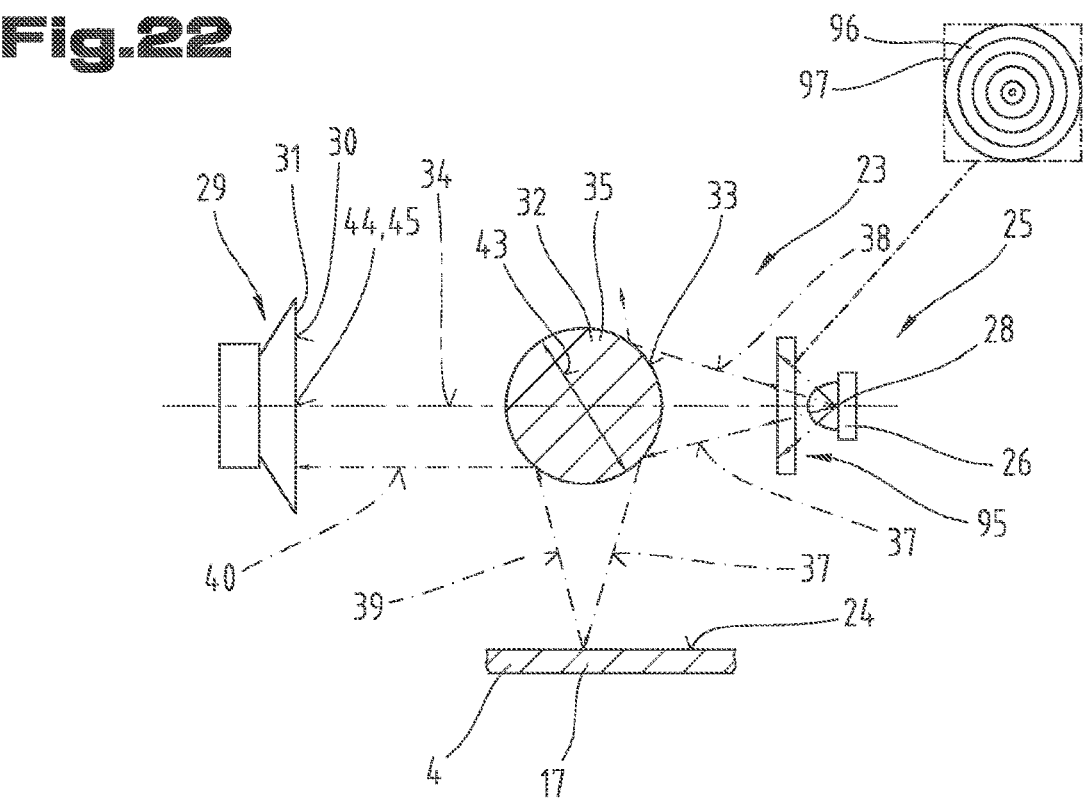
FIG. 22 shows a further example of embodiment of a bending angle measuring device with a filter disk in a cross-sectional representation.

FIG. 22 shows the form of embodiment of the bending angle measuring device 23 in a view corresponding to that in FIG. 4. In this form of embodiment of the bending angle measuring device 23, a filter disk 95 is embodied, which is arranged in the region of the first light beam 37, in particular between the illumination device 25 and the axisymmetric body 32. As can be seen from the cross-sectional view of the filter disk, provision is made for the filter disk to have a transparent region 96 and an opaque region 97. The transparent region 96 and the opaque region 97 are preferably designed in the form of concentrically arranged circles, whereby in the following example of embodiment, the description is in terms of such concentrically arranged circles. As an alternative to the latter, it is also conceivable that instead of the circles that are arranged concentrically with respect to one another, other patterns are used.

The thickness of these circles relative to one another is not decisive for the functionality of the filter disk 95 as described below. However, it appears to be sensible if the transparent regions 96 are kept rather small. As a result, fine lines are projected onto the axisymmetric body 32. The filter disk 95 can, for example, be formed by a transparent plastic, a glass or an otherwise transparent body, on which subregions are darkened and thus an opaque region 97 is formed. The darkening can take place, for example, in the form of an adhesively bonded film, an applied paint, as a result of etching of the transparent body, or by any other method of known art.

Alternatively, it is possible for the opaque regions 97 to be formed by non-transparent materials, and the transparent regions 96 to be formed by an absence of material, that is to say, by air gaps.

The first light beam 37, in particular the brightness distributions generated by the filter disk 95 in the form of circular rings, which are projected onto the rotationally symmetrical body 32, are reflected by the latter and projected onto the surface 24 of the sheet metal part 4.

Figure 23:
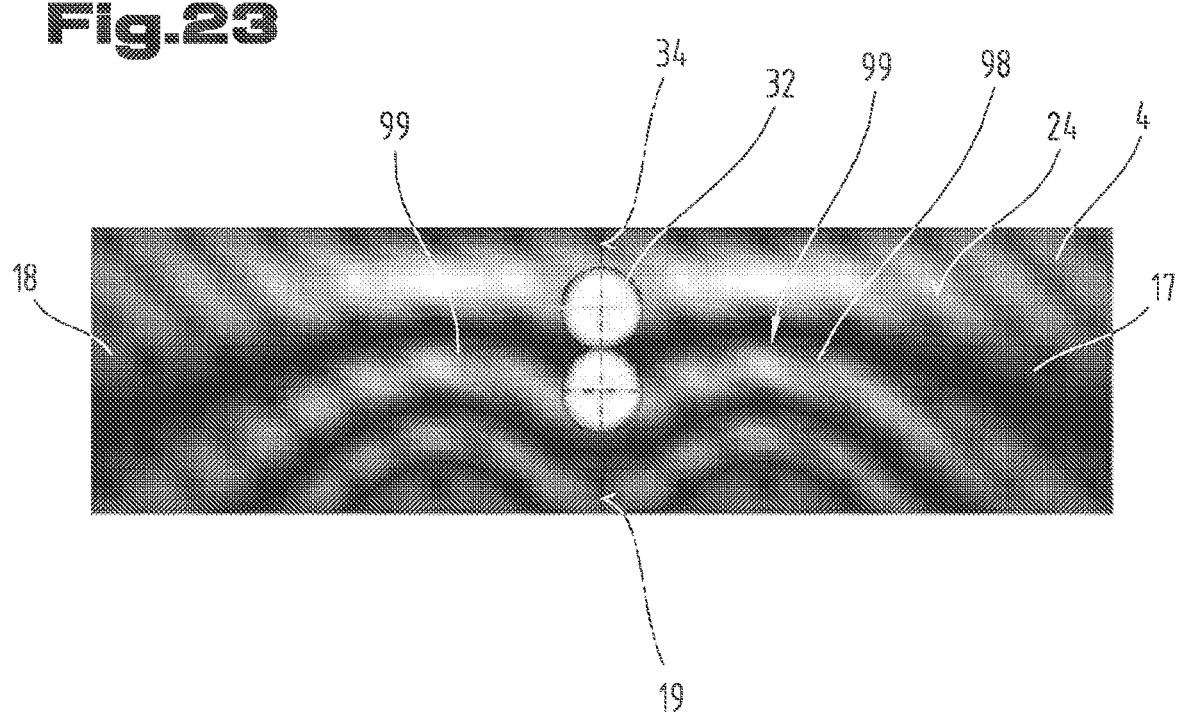
FIG. 23 shows a representation of the projection on the sheet surface of a variant of embodiment with a filter disk.

On the surface 24 of the sheet metal part 4 the brightness distributions appear in the form of hyperbolas 98, as can be seen in FIG. 23. FIG. 23 shows a plan view onto a sheet metal part 4. The hyperbolas 98 have a maximum 99 or a vertex at the point where the surface 24 of the sheet metal part 4 is at right angles to the central axis 34.

In the example of embodiment shown in FIG. 23, in the plan view the central axis 34 is coincidently located with the bending edge 19, and the two sheet metal flanks 17, 18 are bent apart to the same extent. Thus, the hyperbolas on the first sheet metal flank 17 and on the second sheet metal flank 18 have the same appearance. The central axis 34 can also be displaced parallel to the bending edge 19, whereby the appearance of the hyperbolas 98 is distorted, but the vertex of the hyperbolas 98 still lies where the surface 24 of the sheet metal part 4 is at right angles to the central axis 34.

Figure 24:
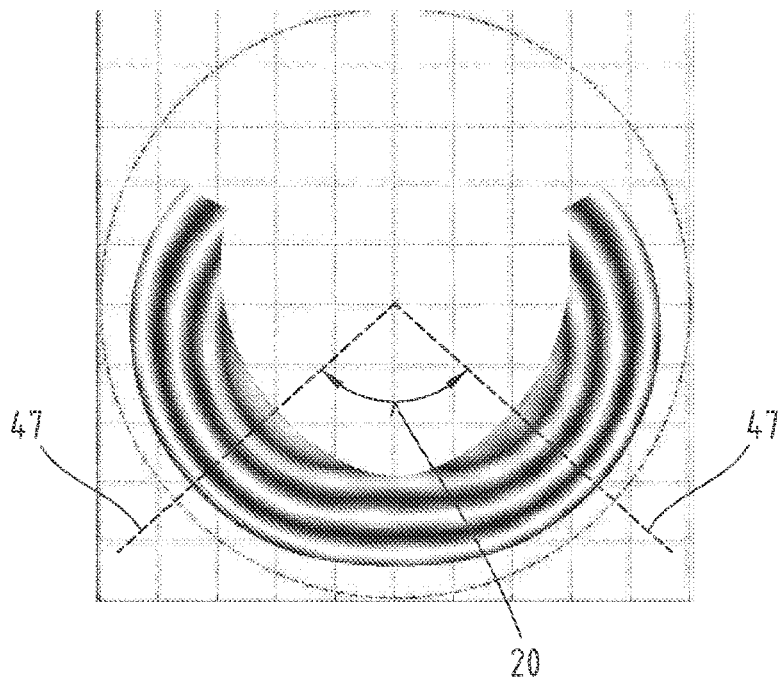
FIG. 24 shows a representation of the result displayed on the image detector of a variant of embodiment with a filter disk.

FIG. 24 shows, in an analogous manner to FIGS. 5 and 19, the result of the third light beam 40 projected onto the optical means of detection 29. As can be seen from FIG. 24, the maximum 99 of the hyperbolas 98 can also be read off in the projection onto the means of detection. Thus it can be concluded that if this maximum is connected by means of a straight line 47 to the centre point 45 of the circular area 41, this straight line 47 is also at right angles to the sheet metal part 4, or rather, its flanks 17, 18. Thus the bending angle 20, as can be seen from FIG. 5, can also be read off between these two straight lines 47.

Figure 25:
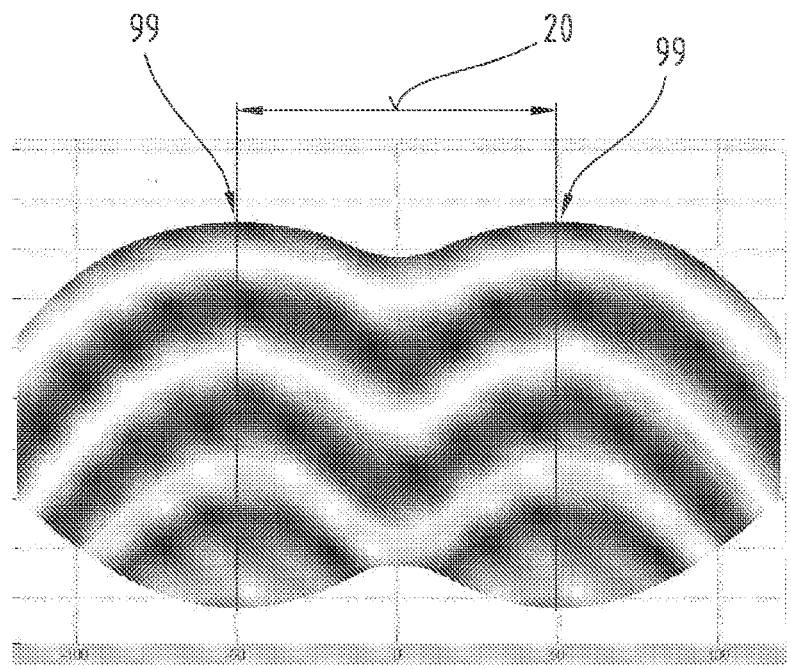
FIG. 25 shows a development of the view in FIG. 24.

FIG. 25 shows, in an analogous manner to FIG. 20, the developed image of such a brightness distribution in the form of hyperbolas. In the developed view, the maxima 99 or vertices of the hyperbolas are better seen.

Figure 26:
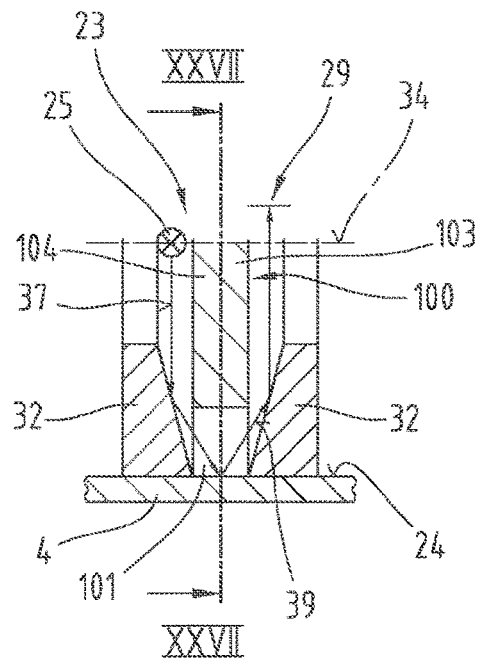
FIG. 26 shows a cross-sectional representation of a further variant of embodiment of the bending angle measuring device with an aperture disk and two axisymmetric bodies.
Figure 27:
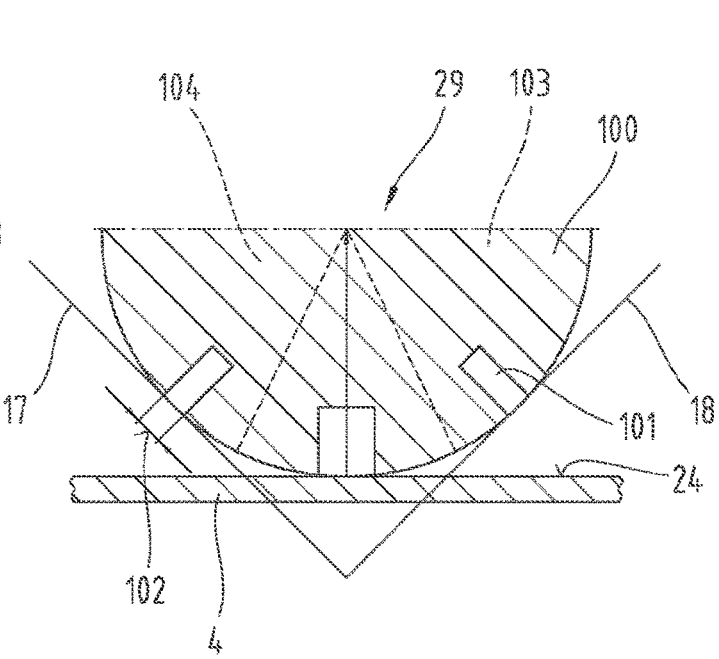
FIG. 27 shows a side view of the further variant of embodiment of the bending angle measuring device with an aperture disk and two axisymmetric bodies.

In FIGS. 26 and 27 is shown a further and optionally self-contained form of embodiment of the bending angle measuring device 23, whereby for the same parts the same reference symbols, or component designations, are used as in the preceding FIGS. 1 to 25. In order to avoid unnecessary repetition, reference is made to the detailed description in the preceding FIGS. 1 to 25.

FIG. 26 shows a cross section of the bending angle measuring device 23 along the central axis 34. FIG. 27 shows a section through the bending angle measuring device 23 along the cross-section line XXVII-XXVII in FIG. 26.

As can be seen from FIG. 26, provision can be made for two axisymmetric bodies 32 to be embodied, the two axisymmetric bodies 32 being designed in the form of conical mirrors. Here a disk aperture 100 can be arranged between the two axisymmetric bodies 32, which has at least two aperture openings 101 to allow light to pass through. The aperture openings 101 can uncover an angular segment 102 for the passage of a light beam through the disk aperture 100. The disk aperture 100 is preferably arranged coaxially with the central axis 34. In particular provision can be made for the disk aperture 100 during the bending process, or at least during the angle measuring process, to abut against the sheet metal part 4, The first light beam 37 is emitted from the illumination device 25 and impinges on the first axisymmetric body 32, which is designed in the form of a cone. From the first axisymmetric body 32, the first light beam 37 is then projected onto the surface 24 of the sheet metal part 4, and is reflected from the latter as a second light beam 39, whereby the latter passes through the disk aperture 100 in the region of an aperture opening 101. Here the aperture opening 101 must be at right angles to the respective flank 17, 18 of the sheet metal part 4 to be detected. The second light beam 39 is then projected onto the second axisymmetric body 32, and as a third light beam 40 is projected from the latter onto the optical means of detection 29. As can be seen from FIGS. 26 and 27, provision can be made for the optical means of detection 29 to be arranged parallel to the surface 24 of a sheet metal part 4, that is not yet bent and is located in a neutral position.

By virtue of the aperture opening 101, that is to say, the disk aperture 100, those light beams are filtered, that is to say, blocked, that do not impinge at right angles onto the sheet. By this means the evaluation of the current bending angle can be prevented from becoming more difficult as a result of disturbing light reflections, that is to say, the result can be prevented from becoming distorted. For example, disturbing phenomena, such as can be seen in FIG. 5, can by this means be avoided.

In order to ensure the functionality of the aperture disk 100 it must be ensured that the aperture openings 101 are matched to the actual bending angle that is present. This can, for example, be achieved if the aperture disk 100 has a large number of aperture openings 101, whereby the number of aperture openings 101 influences or determines the resolution accuracy of the bending angle measuring device 23.

In an alternative variant of embodiment, provision can be made for two disk elements 103, 104 to be arranged coaxially with one another, and for each of the disk elements 103, 104 to have only one or a few aperture openings 101, and for the two disk elements 103, 104 to be rotatable relative to one another, so that the aperture openings 101 can be preset such that the region of the bending angle that is likely to be produced is uncovered with a sufficiently large tolerance. The actual bending angle that is present can then be determined by means of the already described method, whereby the quality of detection can be improved by virtue of the aperture disk 100.

Figure 28:
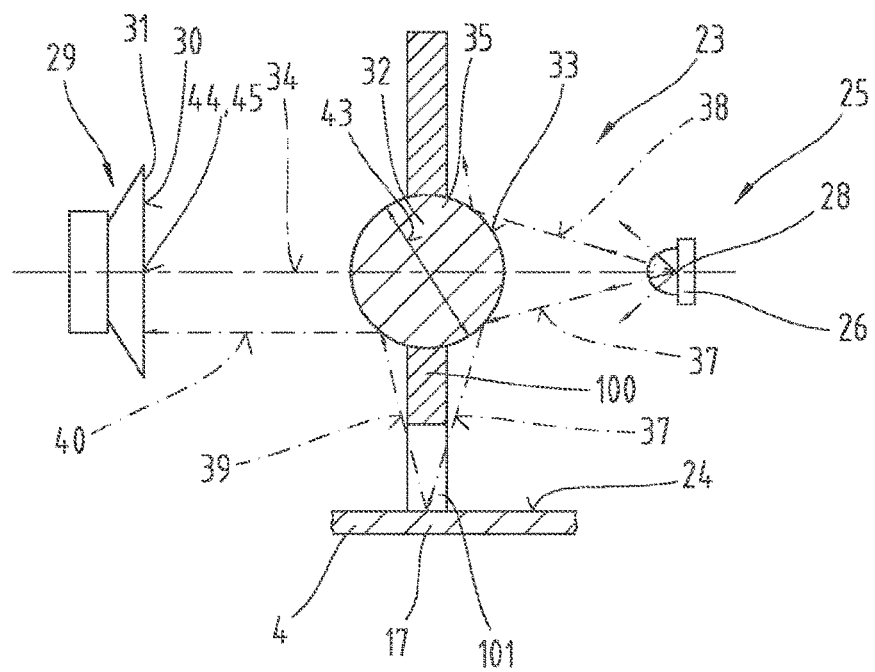
FIG. 28 shows a cross-sectional representation of a further variant of embodiment of the bending angle measuring device with an aperture disk and one axisymmetric body.

In FIG. 28 is shown a further and optionally self-contained form of embodiment of the bending angle measuring device 23, whereby for the same parts the same reference symbols, or component designations, are used as in the preceding FIGS. 1 to 27. In order to avoid unnecessary repetition, reference is made to the detailed description in the preceding FIGS. 1 to 27.

A disk aperture is also embodied in the example of embodiment in FIG. 28, whereby the disk aperture 100 is arranged such that it surrounds the centrally arranged axisymmetric body 32.

In FIGS. 29 and 30 is shown a further and optionally self-contained form of embodiment of the bending angle measuring device 23, whereby for the same parts the same reference symbols, or component designations, are used as in the preceding FIGS. 1 to 28. In order to avoid unnecessary repetition, reference is made to the detailed description in the preceding FIGS. 1 to 28.

The bending angle measuring device 23 of FIGS. 29 and 30 is constructed in a similar manner to the bending angle measuring device 23 of FIGS. 26 and 27. In contrast to the above-described example of embodiment, however, a strip aperture 105 is provided in the described variant of embodiment, instead of the disk aperture 100. The strip aperture 105 is arranged directly in front of the optical means of detection 29, and has a central aperture opening 106. Incident light can only pass through this central aperture opening 106 onto the light-detecting surface 30 of the optical means of detection 29. As can be seen from FIG. 30, only those light beams pass through this central aperture opening 106, which are reflected as third light beams 40 at right angles from the surface 24 of the sheet metal part 4. The size of the aperture opening 106 can be varied and matched to the requirements of the measurement structure.

The examples of embodiment show possible variants of embodiment of the bending angle measuring device 23, whereby it is noted at this point that the invention is not restricted to the variants of embodiment specifically illustrated, but rather that various combinations of the individual variants of embodiment with one another are also possible, and these possible variations lie within the ability of the person skilled in the art and active in this technical field by virtue of the teaching of technical action by means of objective invention.

Furthermore, individual features, or combinations of features from the various examples of embodiment shown and described can represent self-contained, inventive solutions, or solutions in accordance with the invention.

The task underlying the self-contained inventive solutions can be taken from the description.

All details regarding ranges of values in the collective description are to be understood also to include any and all sub-ranges of the latter, e.g. the range 1 to 10 is to be understood also to include all sub-ranges starting from the lower limit 1 and the upper limit 10, i.e. all sub-ranges begin with a lower limit of 1 or greater, and end at an upper limit of 10 or less, e.g. 1 to 1.7, or 3.2 to 8.1, or 5.5 to 10.

Above all, the individual embodiments shown in FIGS. 1 to 21 can form the subject matter of self-contained solutions in accordance with the invention. The related tasks and solutions in accordance with the invention are to be found in the detailed descriptions of these figures.

For the sake of clarity, it should finally be pointed out that, for a better understanding of the construction of the bending angle measuring device 23 and the processing plant 1, these or their constituent parts have been partially shown not to scale, and/or enlarged, and/or reduced in size.

| | List of reference symbols |
|---|---|
| 1 | Processing plant |
| 2 | Bending machine |
| 3 | Bending press |
| 4 | Sheet metal part |
| 5 | Machine frame |
| 6 | Upper press beam |
| 7 | First tool holder |
| 8 | Bending punch |
| 9 | Lower press beam |
| 10 | Second tool holder |
| 11 | Bending die |
| 12 | Sheet support surface |
| 13 | Press drive unit |
| 14 | Upper end position |
| 15 | Lower end position |
| 16 | Working edge |
| 17 | First flank |
| 18 | Second flank |
| 19 | Bending edge |
| 20 | Bending angle |
| 21 | Computer unit |
| 22 | Input/display unit |
| 23 | Bending angle measuring device |
| 24 | Surface of sheet metal part |
| 25 | Illumination device |
| 26 | Light source |
| 27 | Device for generating brightness distribution |
| 28 | Point-form light source |
| 29 | Optical detector |
| 30 | Light-detecting surface |
| 31 | Image detector |
| 32 | Axisymmetric body |
| 33 | Axisymmetric reflecting Surface of axisymmetric body |
| 34 | Central axis |
| 35 | Sphere |
| 36 | Plane ε |
| 37 | First light beam |
| 38 | Non-relevant beam path |
| 39 | Second light beam |
| 40 | Third light beam |
| 41 | Circular area |
| 42 | Diameter of circular area |
| 43 | Surface of axisymmetric body |
| 44 | Center of light-detecting surface |
| 45 | Center point of circular area |
| 46 | Maximum of luminosity |
| 47 | Straight line |
| 48 | First angle |
| 49 | Second angle |
| 50 | Collimator |
| 51 | Parabolic mirror |
| 52 | Distance (r) between maximum luminosity and centre point of circular area |
| 53 | Radius (R) of sphere |
| 54 | Distance ($D_r$) between sheet metal part and central axis |
| 55 | Distance (D) |

| | List of reference symbols |
|---|---|
| 56 | Distance (S) |
| 57 | Angle (α) |
| 58 | Angle of reflection (β) |
| 59 | Distance between sphere and sphere |
| 60 | Plane of symmetry |
| 61 | Distance between sphere and plane of symmetry |
| 62 | Point |
| 63 | Point |
| 64 | Point |
| 65 | Point |
| 66 | Point |
| 67 | Point |
| 68 | Bending radius |
| 69 | Sphere |
| 70 | Angle of deflection of first light beam |
| 71 | First mirror |
| 72 | Mirror plane |
| 73 | Angle of arrangement of first mirror |
| 74 | Center of first mirror |
| 75 | Beam splitter |
| 76 | Second mirror |
| 77 | Center of second mirror |
| 78 | Angle of arrangement of beam splitter |
| 79 | Splitter plane |
| 80 | Angle of arrangement of second mirror |
| 81 | Angle of deflection of third light beam |
| 82 | Normal distance |
| 83 | Angular separation |
| 84 | Bore |
| 85 | Housing |
| 86 | Opening |
| 87 | Fiber optic cable |
| 88 | Light input module |
| 89 | Input surface |
| 90 | Angular separation |
| 91 | Fiber |
| 92 | Separation |
| 93 | Absolute angle |
| 94 | Absolute separation |
| 95 | Filter disk |
| 96 | Transparent region |
| 97 | Opaque region |
| 98 | Hyperbola |
| 99 | Maximum |
| 100 | Disk aperture |
| 101 | Aperture opening |
| 102 | Angular segment |
| 103 | First disk element |
| 104 | Second disk element |
| 105 | Strip aperture |
| 106 | Central aperture opening |

The invention claimed is:

1. A bending angle measuring device for a bending machine for bending a sheet metal part, the sheet metal part having a first and a second flank and a bending edge located between the first and the second flanks, wherein the bending angle measuring device comprises:
an illumination device comprising at least one light source,
an optical detector comprising a light-detecting surface, and
at least one axisymmetric body comprising an axisymmetric reflecting surface and a central axis, wherein the central axis of the axisymmetric body is aligned parallel to the bending edge,
wherein a first light beam transmitted by the illumination device is reflected from the sheet metal part in a right angle as viewed in a frontal view to the central axis, and is directed onto the axisymmetric reflecting surface of the axisymmetric body in the form of a second light beam, and is directed onto the optical detector in the form of a third light beam.

2. The bending angle measuring device in accordance with claim 1, wherein the light-detecting surface of the optical detector is arranged standing normal to the central axis of the axisymmetric body.

3. The bending angle measuring device in accordance with claim 1, wherein the illumination device, the axisymmetric body, and the optical detector are arranged on a common axis parallel to the bending edge.

4. The bending angle measuring device in accordance with claim 1, further comprising:
a beam splitter arranged at an angle of 45° to the central axis of the axisymmetric body, or
a first mirror arranged at an angle of 45° to the central axis of the axisymmetric body,
wherein the first light beam is generated by the illumination device at an angle of 90° to the central axis of the axisymmetric body and is deflected via the beam splitter or via the first mirror such that the first light beam runs essentially parallel to the central axis of the axisymmetric body, and
wherein the illumination device is also arranged at an angle of 90° to the central axis of the axisymmetric body.

5. The bending angle measuring device in accordance with claim 1, further comprising:
a beam splitter arranged at an angle of 45° to the central axis of the axisymmetric body, or
a mirror arranged at an angle of 45° to the central axis of the axisymmetric body,
wherein the third light beam is deflected by the axisymmetric body, runs parallel to the central axis of the axisymmetric body, and via the beam splitter or via the mirror is deflected through an angle of 90° relative to the central axis of the axisymmetric body, and
wherein the optical detector is also arranged at an angle of 90° relative to the central axis of the axisymmetric body.

6. The bending angle measuring device in accordance claim 1, wherein the illumination device comprises an essentially point-form light source.

7. The bending angle measuring device in accordance with claim 1, wherein the illumination device comprises a brightness distributor configured to generate a brightness distribution for the first light beam, the brightness distributor comprising a projector.

8. The bending angle measuring device in accordance with claim 1, wherein the illumination device further comprises a collimator or a parabolic mirror for purposes of generating a parallel beam profile for the first light beam.

9. The bending angle measuring device in accordance with claim 1, wherein the optical detector comprises a two-dimensional image detector.

10. The bending angle measuring device in accordance with claim 1, wherein the axisymmetric body is a sphere.

11. The bending angle measuring device in accordance with claim 1, further comprising a housing having an opening, the housing at least partially surrounding the illumination device, the axisymmetric body, and the optical detector,
wherein the opening of the housing is disposed in a vicinity of the axisymmetric body.

12. The bending angle measuring device in accordance with claim 1, further comprising a strip cover arranged directly in front of the optical detector,
wherein the strip cover has a central aperture opening.

13. The bending angle measuring device in accordance with claim 1, further comprising a filter disk arranged between the illumination device and the axisymmetric body, wherein the filter disk comprises transparent regions and opaque regions.

14. The bending angle measuring device in accordance with claim 13, wherein the transparent regions and the opaque regions of the filter disk are concentric circles.

15. The bending angle measuring device in accordance with claim 1, further comprising a disk cover arranged between the illumination device and the optical detector, the disk cover comprising an axis of rotation, an angular segment, an outer periphery, and cover openings,
wherein the cover openings are arranged on the outer periphery of the disk aperture and extend over an angular segment, and
wherein the axis of rotation of the disk aperture is located essentially coaxially with the central axis of the axisymmetric body.

16. The bending angle measuring device in accordance with claim 15, wherein the cover openings are distributed over a full peripheral angle of the disk cover, and
wherein a segmentation of the cover openings is matched to a resolution accuracy of the optical detector.

17. A bending machine comprising:
a machine frame,
an upper press beam,
a lower press beam,
tool holders arranged on the upper and the lower press beam,
a bending punch accommodated in the tool holders and comprising a working edge,
a bending die accommodated in the tool holders, and
a bending angle measuring device in accordance with claim 1,
wherein the bending machine is configured to hold a sheet metal part between the bending punch and the bending die such that a bending edge of the sheet metal part located between a first and a second flank of the sheet metal part is coincidently located with the working edge of the bending punch.

18. A method for determining a bending angle of a sheet metal part comprising:
providing a bending angle measuring device comprising an illumination device comprising at least one light source, an optical detector comprising a light-detecting surface, and an axisymmetric body comprising a central axis and an axisymmetric reflecting surface;
deforming the sheet metal part using a bending machine to form a bending edge on the sheet metal part between a first flank and a second flank of the sheet metal part;
aligning the central axis of the axisymmetric body parallel to the bending edge; and
determining the bending angle of the first flank and the second flank relative to one another by at least the following steps:
emitting a first light beam from the illumination device;
reflecting the first light beam on a surface of the sheet metal part in a right angle as viewed in a frontal view to the central axis to form a second light beam;
reflecting the second light beam on the axisymmetric reflecting surface of the axisymmetric body to form a third light beam aligned parallel to the central axis of the axisymmetric body and thus parallel to the bending edge;
deflecting the third light beam either directly or by way of further deflection onto the light-detecting surface of the optical detector;
recording of the third light beam by the optical detector;
evaluating the third light beam recorded by the optical detector; and
calculating the bending angle of the first flank and/or the second flank of the sheet metal part.

19. The method in accordance with claim 18, wherein the first light beam is generated by an essentially point-form light source, is aligned parallel to the central axis of the axisymmetric body, and emanating from the illumination device is beamed onto the axisymmetric body, whence the first light beam is reflected and directed onto the surface of the sheet metal part.

20. The method in accordance with claim 18, wherein the first light beam is emitted from the light source and, after the emission from the light source, is formed into an essentially parallel light bundle via a collimator, or via a parabolic mirror.

21. The method in accordance with claim 18, wherein the third light beam, via a mirror, or via a beam splitter, arranged at an angle of 45° to the central axis of the axisymmetric body, is deflected through 90°, so that the third light beam encounters the light-detecting surface of the optical detector arranged at an angle of 90° to the central axis of the axisymmetric body.

22. The method in accordance with claim 18, wherein the illumination device is aligned such that the first light beam is emitted at an angle of 90° relative to the central axis of the axisymmetric body, and
wherein the first light beam, via a first mirror arranged at an angle of 45° to the central axis of the axisymmetric body, or via a beam splitter arranged at an angle of 45° to the central axis of the axisymmetric body, is deflected through an angle of 90°, so that the first light beam is aligned essentially parallel to the central axis of the axisymmetric body and is directed onto the axisymmetric body.

23. The method in accordance with claim 18, wherein the illumination device further comprises a brightness distributor comprising a projector,
wherein as a part of the emission of the first light beam from the illumination device the first light beam is projected with a strip-form brightness distribution onto the surface of the sheet metal part,
wherein the third light beam impinges onto the light-detecting surface in the form of a circular area,
wherein individual strips reflected from the sheet metal part are projected onto the circular area with an angular separation from one another, and
wherein the bending angle is calculated in that the angular separation of the individual strips is determined in the circular area.

24. The method in accordance with claim 18, wherein the first light beam from the illumination device is emitted onto a filter disk,
wherein the filter disk has transparent regions and opaque regions in the form of concentric circles, whereby rings with a brightness distribution are projected onto the axisymmetric body, and from the axisymmetric body onto the surface of the sheet metal part,
wherein the brightness distribution can be seen on the surface of the sheet metal part in the form of hyperbolas, and
wherein a respective vertex or maximum of each of the hyperbolas marks the right angle of the sheet surface onto the central axis of the axisymmetric body, and the vertices of the hyperbolas are visible in the optical detector as maxima.

25. The method in accordance with claim 18, wherein the third light beam impinges onto the light-detecting surface in the form of a circular area,
   wherein a maximum, or a plurality of maxima, of the luminosity of the third light beam within the circular area is or are determined, and
   wherein by connection of the maximum of the luminosity and a central point of the circular area via a straight line, the bending angle of the sheet item is derived.

26. The method in accordance with claim 25, wherein the axisymmetric body is a sphere, and
   wherein a distance from the surface of the sheet metal part to the central axis of the axisymmetric body is calculated by performing a triangulation, the triangulation using a radial distance of the maximum of the luminosity in the circular area from the central point of the circular area, and the triangulation further using a radius of the axisymmetric body.

27. A bending angle measuring device for a bending machine for bending a sheet metal part, the sheet metal part having a first and a second flank and a bending edge located between the first and the second flanks, wherein the bending angle measuring device comprises:
   an illumination device comprising at least one light source,
   an optical detector comprising a light-detecting surface, and
   at least one axisymmetric body comprising an axisymmetric reflecting surface and a central axis, wherein the central axis of the axisymmetric body is aligned parallel to the bending edge,
   wherein a first light beam transmitted by the illumination device is reflected from a first flank of the sheet metal part, and is directed onto the axisymmetric reflecting surface of the axisymmetric body in the form of a second light beam, and is directed onto the optical detector in the form of a third light beam, and
   wherein another first light beam transmitted by the illumination device is reflected from a second flank of the sheet metal part, and is directed onto the axisymmetric reflecting surface of the axisymmetric body in the form of another second light beam, and is directed onto the optical detector in the form of another third light beam, and
   wherein the optical detector and the axisymmetric body are configured such that the bending angle of the first and the second flank of the sheet metal part is calculable by evaluation of the third light beam corresponding to the first flank and the other third light beam corresponding to the second flank recorded by the optical detector.

* * * * *

UNITED STATES PATENT AND TRADEMARK OFFICE
CERTIFICATE OF CORRECTION

PATENT NO. : 10,864,570 B2
APPLICATION NO. : 15/327667
DATED : December 15, 2020
INVENTOR(S) : Angerer et al.

Page 1 of 1

It is certified that error appears in the above-identified patent and that said Letters Patent is hereby corrected as shown below:

On the Title Page

Column 1, item (73), should read as follows:
-- TRUMPF MASCHINEN AUSTRIA GMBH & CO. KG. --

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*